(12) United States Patent
Shimizu

(10) Patent No.: US 8,482,764 B2
(45) Date of Patent: Jul. 9, 2013

(54) INFORMATION PROCESSING SYSTEM, IMAGE INPUT/OUTPUT APPARATUS, AND DATA PROCESSING METHOD

(75) Inventor: Yasushi Shimizu, Narashino (JP)

(73) Assignee: Canon Kabushiki Kaisha, Tokyo (JP)

( * ) Notice: Subject to any disclaimer, the term of this patent is extended or adjusted under 35 U.S.C. 154(b) by 864 days.

(21) Appl. No.: 12/330,516

(22) Filed: Dec. 9, 2008

(65) Prior Publication Data

US 2009/0153899 A1 Jun. 18, 2009

(30) Foreign Application Priority Data

Dec. 13, 2007 (JP) ................. 2007-322541

(51) Int. Cl.
*G06F 3/12* (2006.01)
*G06F 15/00* (2006.01)
*G06K 15/00* (2006.01)

(52) U.S. Cl.
USPC ......... 358/1.15; 358/1.14; 358/1.16; 358/1.8; 358/1.9

(58) Field of Classification Search
USPC ................................. 358/1.13–1.16
See application file for complete search history.

(56) References Cited

U.S. PATENT DOCUMENTS

| | | | |
|---|---|---|---|
| 6,583,886 B1 | 6/2003 | Ochiai | |
| 7,382,484 B2 | 6/2008 | Matsukubo et al. | |
| 2005/0275862 A1 | 12/2005 | Matsumoto et al. | |
| 2005/0275881 A1 | 12/2005 | Akashi et al. | |
| 2005/0275882 A1 | 12/2005 | Yasuda et al. | |
| 2005/0275883 A1 | 12/2005 | Kobayashi et al. | |
| 2005/0289215 A1 | 12/2005 | Namikata et al. | |
| 2006/0028678 A1 | 2/2006 | Negishi et al. | |
| 2008/0030762 A1* | 2/2008 | Morita | 358/1.14 |

FOREIGN PATENT DOCUMENTS

| | | |
|---|---|---|
| JP | 11-53130 | 6/1989 |
| JP | 11-191043 | 7/1999 |

OTHER PUBLICATIONS

U.S. Appl. No. 12/355,752, International filing date: Jan. 24, 2008, Yasushi Shimizu.

* cited by examiner

*Primary Examiner* — Satwant Singh
(74) *Attorney, Agent, or Firm* — Fitzpatrick, Cella, Harper & Scinto

(57) ABSTRACT

An information processing system in which a plurality of image input/output apparatus can communicate with one another via a communication medium is provided. The information processing system includes a transfer unit configured to transfer a job from a first image input/output apparatus to a second image input/output apparatus; and a generating unit configured to generate a job handle used to identify a job on the first image input/output apparatus from the second image input/output apparatus, the job handle allowing the job to be manipulated. When the job is to be transferred by the transfer unit, the job handle generated by the generating unit is transmitted from the first image input/output apparatus to the second image input/output apparatus before the transfer of the job.

18 Claims, 21 Drawing Sheets

INFORMATION PROCESSING SYSTEM, IMAGE INPUT/OUTPUT APPARATUS, AND DATA PROCESSING METHOD

BACKGROUND OF THE INVENTION

1. Field of the Invention

The present invention relates to an image input/output apparatus such as a printer device and multi-function peripheral (MFP) which can output image data as a visible image, an information processing system equipped with the image input/output apparatus, and a data processing method for the information processing system.

2. Description of the Related Art

Along with increases in the use of networked environments, there have emerged network-ready printer devices and MFPs. At offices, in particular, environments in which multiple users share a plurality of MFPs have become common. In such environments the MFPs are often installed at a location away from the users. Consequently, it is conceivable that a job issued by a user is not executed or execution of a job is delayed due to mechanical trouble of a MFP or because a large number of jobs are input. If so, it is often the case that the user realizes that the job has not been executed yet only after finding at the installation location of the MFP that no printed material has been produced from the job issued by the user. This often puts the user under stress.

As a technique for solving this problem, Japanese Patent Laid-Open No. 11-053130 describes a technique for acquiring job processing status and device status (normal/abnormal) remotely via a network.

Also, Japanese Patent Laid-Open No. 11-191043 proposes a technique for printing comfortably by transferring a job among a plurality of devices which is shared.

The above techniques have the following drawbacks. It is troublesome for the user to determine job status on a device located away from the user. Also, since job status changes constantly, it is difficult to keep track of the status if the user is away from a monitor.

When a plurality of devices is shared, it is desirable to transfer a job automatically or manually. In such a case, when the user wants to cancel the job, change a transfer destination of the job, or otherwise manipulate the job, the user has to know the whereabouts of the job before the user can take an action. For example, in FIG. 5, a PC (data processing apparatus) acting as client 1 exists on a LAN on which three devices—multi-function peripherals A to C—can be shared. In FIG. 5, client 1 issues a print job to multi-function peripheral A using PDL data. Next, in FIG. 6, the user learns that multi-function peripheral A which has been requested to execute a job of client 1 is down due to an out-of-toner condition, part failure, or the like. Consequently, the user requests multi-function peripheral A to transfer the job to multi-function peripheral B. In such a case, it is likely that jobs are piled up on multi-function peripheral A, waiting to be printed and that other jobs are also requested to be transferred to another multi-function peripheral. Thus, it is not certain when the job issued by the user of client PC 1 will be transferred from multi-function peripheral A to multi-function peripheral B. Consequently, when the user goes to multi-function peripheral B to pick up printed material, expecting that the job has been printed by multi-function peripheral B, it can happen that the job still remains on multi-function peripheral A, having not been transferred to multi-function peripheral B yet. In such a case, to cancel the job or to transfer the job from multi-function peripheral A to multi-function peripheral C instead of multi-function peripheral B, the user needs to return to multi-function peripheral A. However, if multi-function peripheral A and multi-function peripheral B are distant from each other, it is conceivable that job transfer from multi-function peripheral A to multi-function peripheral B has been completed when the user returns to the location of multi-function peripheral A. Thus, it is difficult to handle a job specified to be transferred.

The present invention solves the problems with the conventional techniques described above.

It is a feature of the present invention to provide a technique which makes it possible to handle a job easily from any of image input/output apparatus of both transfer source and transfer destination.

SUMMARY OF THE INVENTION

According to one aspect of the present invention, there is provided an information processing system in which a plurality of image input/output apparatus can communicate with one another via a communication medium, comprising: a transfer unit configured to transfer a job from a first image input/output apparatus to a second image input/output apparatus; and a generating unit configured to generate a job handle used to identify a job on the first image input/output apparatus from the second image input/output apparatus, the job handle allowing the job to be manipulated, wherein when the job is to be transferred by the transfer unit, the job handle generated by the generating unit is transmitted from the first image input/output apparatus to the second image input/output apparatus before the transfer of the job.

According to another aspect of the present invention, there is provided an image input/output apparatus capable of communicating with another image input/output apparatus via a communication medium, comprising: a transfer unit configured to transfer a job; a generating unit configured to generate a job handle used to identify the job transferred by the transfer unit; a transmitting unit configured to transmit the job handle generated by the generating unit to an image input/output apparatus of a transfer destination of the job before transfer of the job when the job is to be transferred by the transfer unit.

According to still another aspect of the present invention, there is provided an image input/output apparatus capable of communicating with another image input/output apparatus via a communication medium, comprising: a receiving unit configured to receive a job handle before transfer of a job; an identifying unit configured to identify a job held by an image input/output apparatus of a transfer source of the job based on the job handle received by the receiving unit; and a control unit configured to perform control so that a manipulation of the job identified by the identifying unit will be performed before transfer of the job.

According to yet another aspect of the present invention, there is provided a data processing method for an information processing system in which a plurality of image input/output apparatus can communicate with one another via a communication medium, the data processing method comprising: transferring a job from a first image input/output apparatus to a second image input/output apparatus; and generating a job handle used to identify a job on the first image input/output apparatus from the second image input/output apparatus, the job handle allowing the job to be manipulated, wherein when the job is to be transferred at the transferring, the job handle generated at the generating is transmitted from the first image input/output apparatus to the second image input/output apparatus before transfer of the job.

Further features of the present invention will become apparent from the following description of exemplary embodiments with reference to the attached drawings.

DESCRIPTION OF THE EMBODIMENTS

Preferred embodiments of the present invention will be described in detail below with reference to the drawings. However, it should be understood that the present invention is not limited to the specific embodiments described below, except as defined in the appended claims. Also, it should be noted that a combination of all the features described in the embodiments are not necessarily essential for the solutions provided by the present invention.

Figure 1:
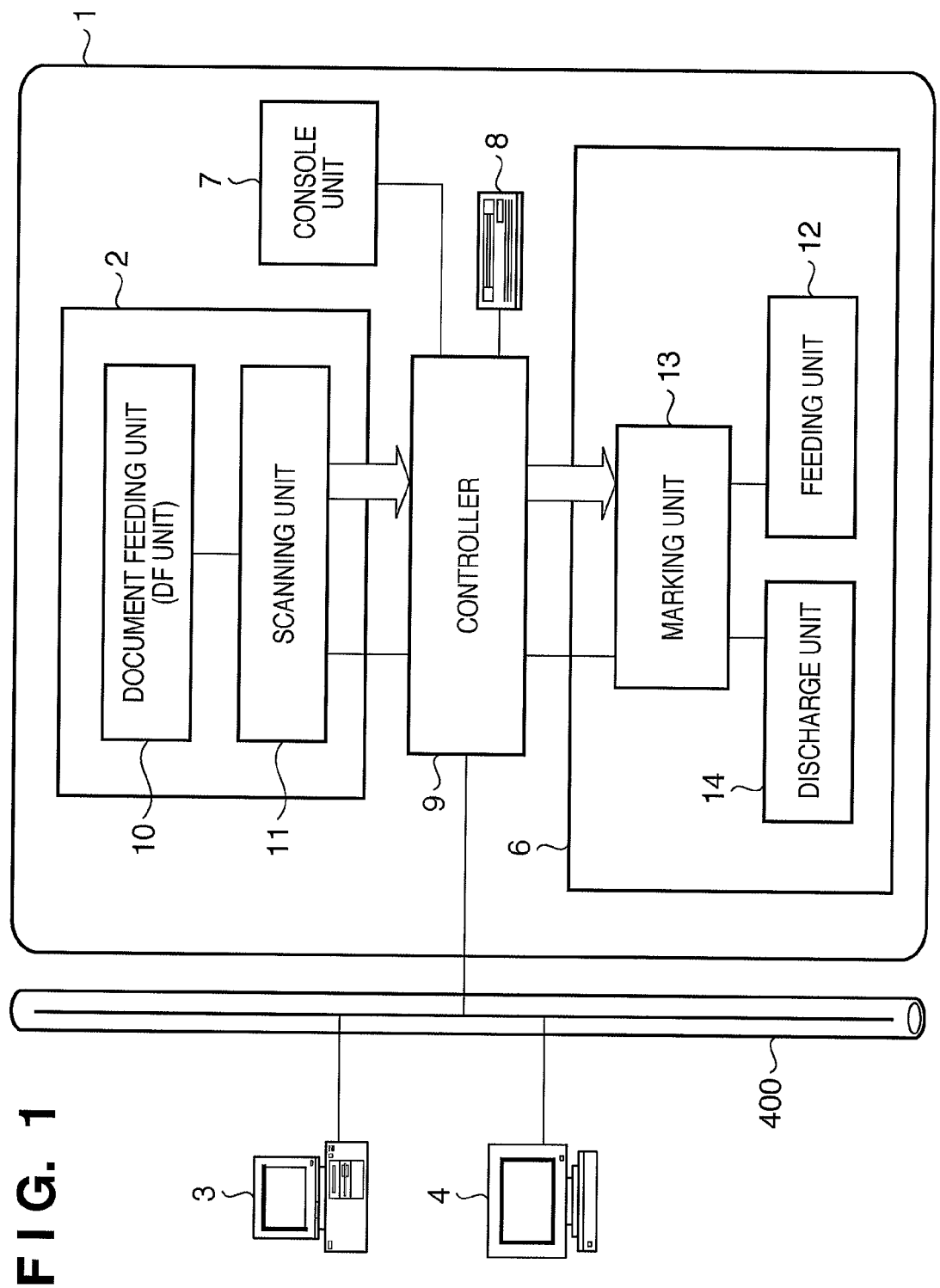
FIG. 1 is a block diagram showing a configuration of an image input/output apparatus according to an embodiment of the present invention, where a controller is mounted on the image input/output apparatus.

FIG. 1 is a block diagram showing a configuration of an image input/output apparatus 1 according to an embodiment of the present invention, where a controller is mounted on the image input/output apparatus. It should be noted that although a multi-function peripheral which has a copy function, facsimile function, printer function, and the like is taken as an example of the image input/output apparatus in the present embodiment, the present invention is not limited to this.

The image input/output apparatus 1 is connected with host computers (first and second host computers 3 and 4) via LAN (communication medium) 400 such as an Ethernet (registered computers 3 and 4), being ready to communicate with each other.

The image input/output apparatus 1 includes a reader (reading unit) 2 which reads image data, a printer (printing unit) 6 which prints image data, a console unit 7, a hard disk (image storage unit) 8, and a controller 9 which controls these units. The console unit 7 includes a keyboard used to input and output image data and a liquid display panel used for display/setting of image data and various functions. The image storage unit 8 stores the image data read via the reading unit 2 as well as image data generated from code data received from the host computer 3 or 4 via the LAN 400. The controller 9 is connected to these components and controls them.

The reading unit 2 includes a document feeding unit 10 which conveys documents and a scanning unit 11 which optically reads the documents and converts them into image data in the form of an electrical signal. On the other hand, the printing unit 6 includes a feeding unit 12 equipped with multiple tiers of paper feed trays which contain sheets, a marking unit 13 which transfers and fixes image data to the sheets, and a discharge unit 14 which discharges the printed sheets after sorting and stapling processes.

The controller 9 has a copy function, a scanner function, a printer function, and other functional blocks, where the copy function reads image data from documents by controlling the reading unit 2 and prints the image data on sheets by controlling the printing unit 6, the scanner function converts image data read via the reading unit 2 into code data and transmits the code data to the host computer 3 or 4 via the LAN 400, and the printer function converts code data received from the host computer 3 or 4 via the LAN 400 into image data, outputs the image data to the printing unit 6, and prints the image data using the printing unit 6.

Figure 2:
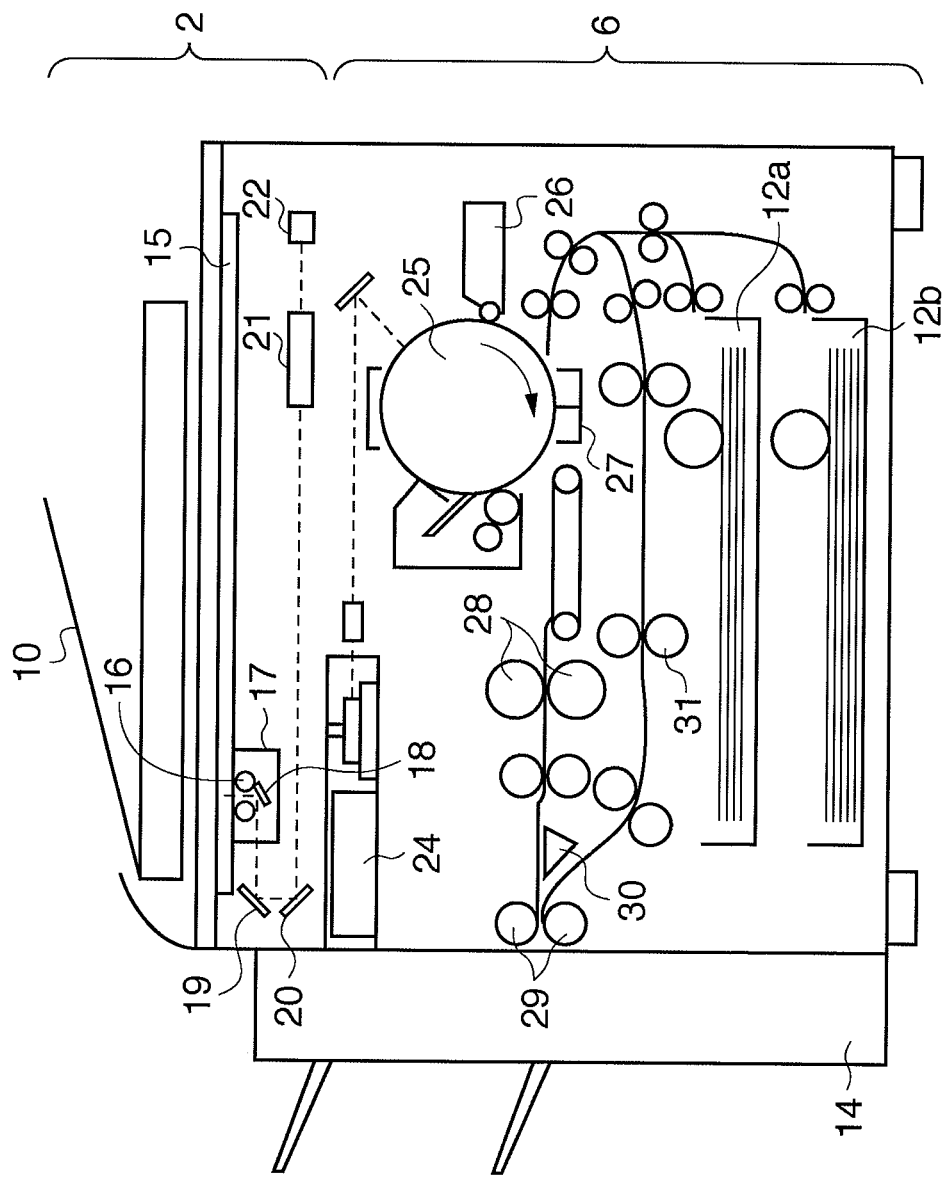
FIG. 2 is a diagram showing details of a reading unit and printing unit of the image input/output apparatus according to the present embodiment.

FIG. 2 is a diagram showing details of a reading unit 2 and printing unit 6 of the image input/output apparatus 1 according to the present embodiment.

In the reading unit 2, documents stacked on the document feeding unit 10 are fed one after another onto a platen glass 15 in the order in which they are stacked. The documents are read by the scanning unit 11, and then discharged from the platen glass 15 to the document feeding unit 10. In the scanning unit 11, a lamp 16 comes on when a document is conveyed onto the platen glass 15. Then, an optical unit 17 starts to move and is fixed at a reading position. The optical unit 17 scans the conveyed document by illuminating it from below. Light reflected from the document is led to a CCD image sensor (hereinafter referred to as a CCD) 22 via a plurality of mirrors 18 to 20 and a lens 21 and read by the CCD 22. Resulting image data produced by the CCD 22 is transferred to the controller 9 (FIG. 1) after going through predetermined processing. Alternatively, with the lamp 16 coming on and the optical unit 17 starting to move similarly, the document placed on the platen glass 15 and illuminated from below can be scanned by the optical unit 17 and thereby read directly by the CCD 22.

Next, in the printing unit 6, a laser beam corresponding to the image data output from the controller 9 is emitted from a laser emitting unit 24 driven by a laser driver (not shown). The laser beam illuminates a photosensitive drum 25 of the marking unit 13 to form an electrostatic latent image. Then, toner (developing powder) supplied from a developer 26 attaches to the electrostatic latent image.

In sync with the emission of the laser beam, a sheet supplied from the feeding unit 12 (paper feed tray 12a or 12b) is conveyed to a transfer unit 27 and a toner image is transferred from the photosensitive drum 25 to the sheet. The sheet onto which image data has been transferred is conveyed to a fixing unit 28 which then fixes the image data on the sheet by heating and pressing processes.

To print the image data single-sided on the sheets, the sheets passing through the fixing unit 28 are discharged by a discharge roller 29 directly to the discharge unit 14. The discharge unit 14 bundles and sorts the discharged sheets, and then staples the sorted sheets. To print the image data double-sided on sheets, after each sheet is conveyed to the discharge roller 29, rotational direction of the discharge roller 29 is reversed to guide the sheet printed on one side to a refeed-conveyance path 31 by a flapper 30. The sheet guided to the refeed-conveyance path 31 is conveyed to the transfer unit 27 in a manner similar to the one described above.

As described above, the controller 9, which includes a single electronic component, implements a scanner function, a printer function, and other functional blocks, where the scanner function converts image data read via the reading unit 2 into code and transmits the code to the host computer 3 or 4 via the LAN 400, and the printer function converts code data received from the host computer 3 or 4 via the LAN 400 into image data, outputs the image data to the printing unit 6, and prints the image data using the printing unit 6.

Figure 3:
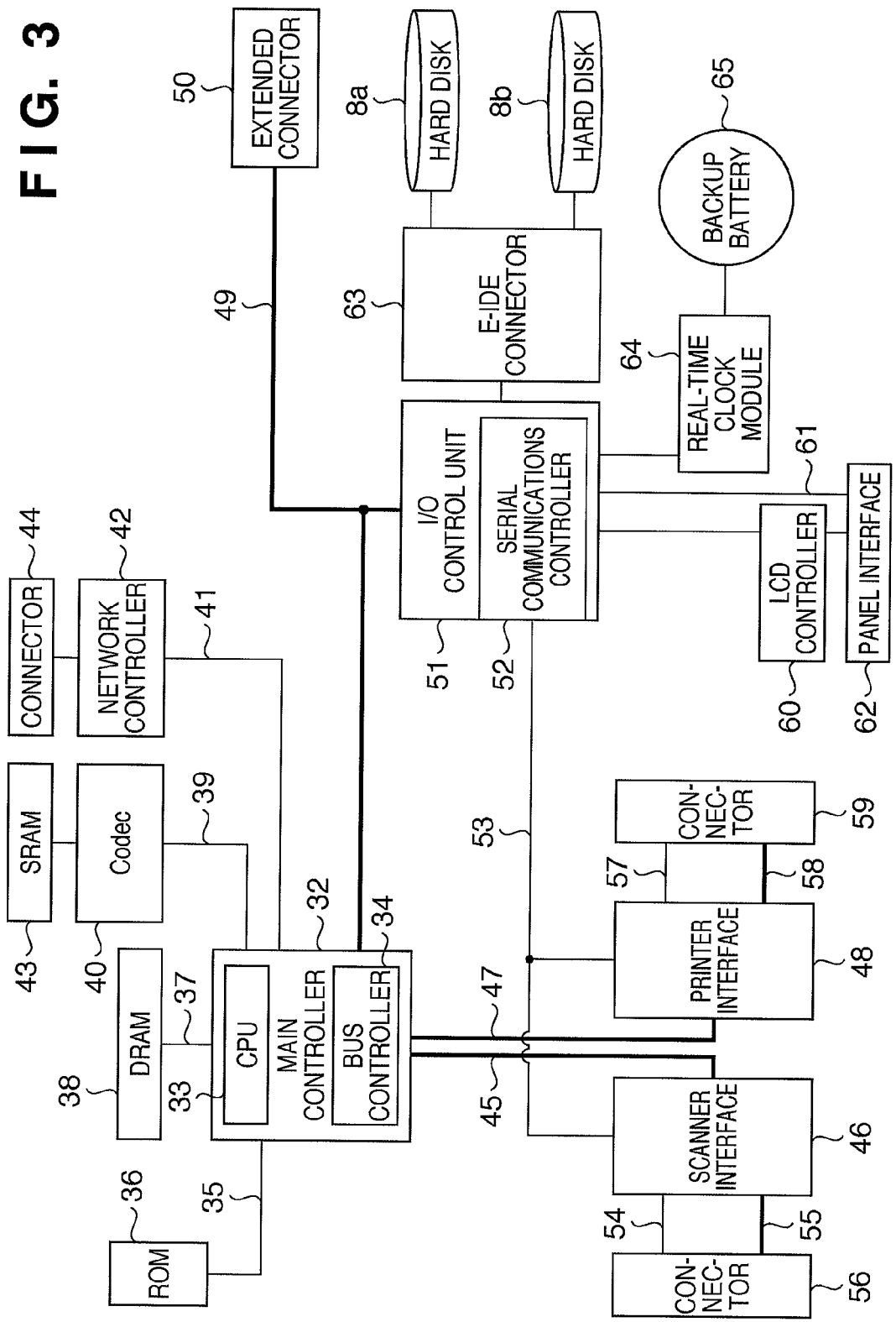
FIG. 3 is a diagram illustrating a configuration of the controller according to the present embodiment.

FIG. 3 is a diagram illustrating a configuration of the controller 9 according to the present embodiment.

A main controller 32 includes a CPU 33, bus controller 34, and functional block which includes various controllers described later. Also, the main controller 32 is connected with a ROM 36 via a ROM interface 35 and with a DRAM 38 via a DRAM interface 37. Furthermore, the main controller 32 is connected with a codec 40 via a codec interface 39 and with a network controller 42 via a network interface 41.

The ROM 36 stores computational data as well as various control programs executed by the CPU 33 of the main controller 32. The DRAM 38 provides a working area for the CPU 33 and an area used to accumulate image data. The codec 40 compresses raster image data accumulated in the DRAM 38 in a known compression format such as MH, MR, MMR, or JBIG and decompresses compressed data into raster image data. Also the codec 40 is connected with an SRAM 43 which is uses as a temporary working area for the codec 40. The network controller 42 performs predetermined control operations with respect to the LAN 400 via a connector 44.

Also, the main controller 32 is connected with a scanner interface 46 via a scanner bus 45 and with a printer interface 48 via a printer bus 47. Furthermore, the main controller 32 is connected with an extended connector 50 and input/output control unit (I/O control unit) 51 via a general-purpose high-speed bus 49 such as a PCI bus, where the extended connector 50 is used to connect with an extension board. The I/O control unit 51 is equipped with a two-channel asynchronous serial communications controller 52 to exchange control commands with the reading unit 2 and printing unit 6. The serial communications controller 52 is connected with the scanner interface 46 and printer interface 48 via an I/O bus 53.

The scanner interface 46 is connected to a scanner connector 56 via a first asynchronous serial interface 54 and first video interface 55. The scanner connector 56 is connected to the scanning unit 11 of the reading unit 2. The scanner interface 46 performs binary conversion processing and scaling processing in a main scanning direction and/or sub scanning direction on image data received from the scanning unit 11. Also, the scanner interface 46 generates a control signal based on a video signal from the scanning unit 11 and transfers the control signal to the main controller 32 via the scanner bus 45.

The printer interface 48 is connected to a printer connector 59 via a second asynchronous serial interface 57 and second video interface 58. Furthermore, the printer connector 59 is connected to the marking unit 13 of the printing unit 6. The printer interface 48 performs smoothing processing on image data output from the main controller 32 and outputs the image data to the marking unit 13. Furthermore, the printer interface 48 outputs a generated control signal based on a video signal from the marking unit 13 and outputs the generated control signal to the printer bus 47.

The CPU 33 operates based on a control program read from the ROM 36 via the ROM interface 35. For example, the CPU 33 interprets PDL (page-description language) data received from the first and second host computers 3 and 4 and decompresses the PDL data into raster image data. The bus controller 34 controls data transfer to/from external devices connected to the scanner interface 46, printer interface 48, extended connector 50, and the like, and thereby arbitrates bus conflicts and controls DMA data transfers. Specifically, for example, the bus controller 34 controls DMA transfers including data transfers between the DRAM 38 and codec 40, data transfers from the scanning unit 11 to the DRAM 38, and data transfers from the DRAM 38 to the marking unit 13.

The I/O control unit 51 is connected with a panel interface 62 via an LCD controller 60 and key input interface 61. The panel interface 62 is connected to the console unit 7. The I/O control unit 51 is connected to hard disk drives 8a and 8b via an E-IDE connector 63. Furthermore, the I/O control unit 51 is connected to a real-time clock module 64 which updates and stores the date and time managed in the device. Incidentally, the real-time clock module 64 is connected with, and backed up by, a backup battery 65.

Figure 4:
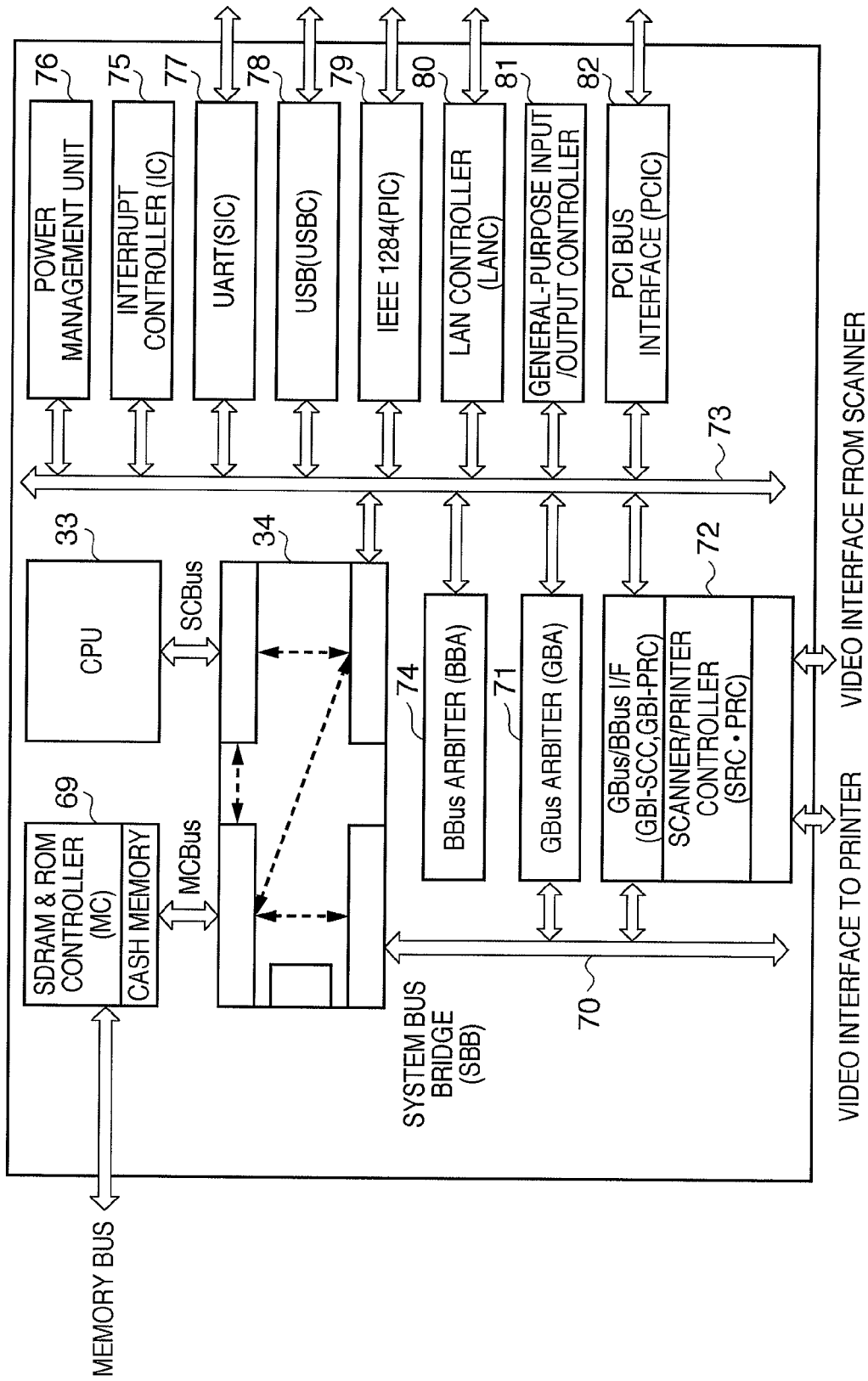
FIG. 4 is a block diagram showing inner details of a main controller according to the present embodiment.
Figure 5:
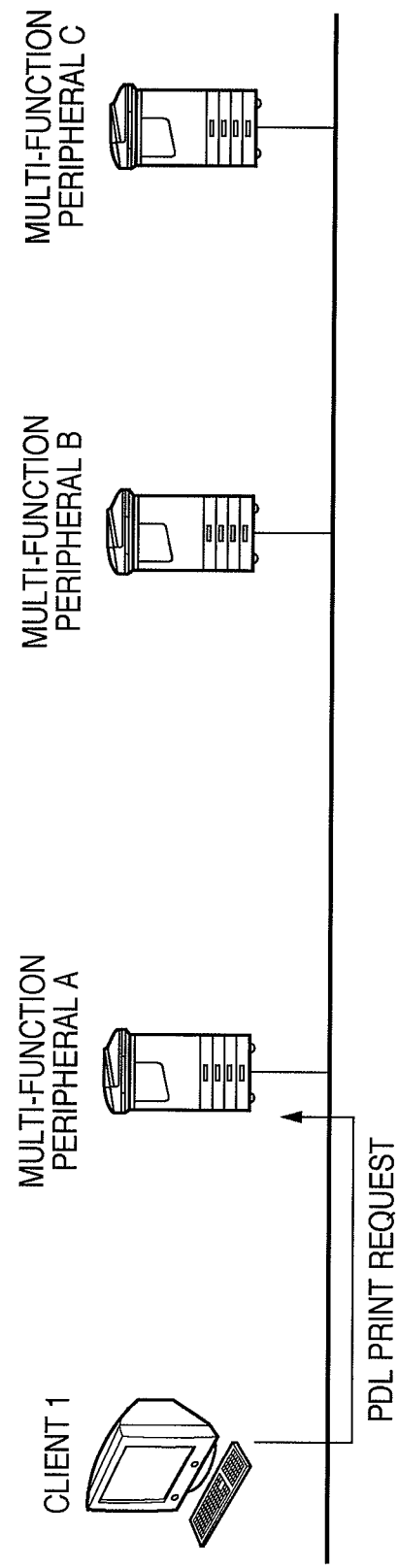
FIG. 5 is a diagram illustrating a typical printing environment in which a client PC and three multi-function peripherals A to C are connected via a LAN.
Figure 6:
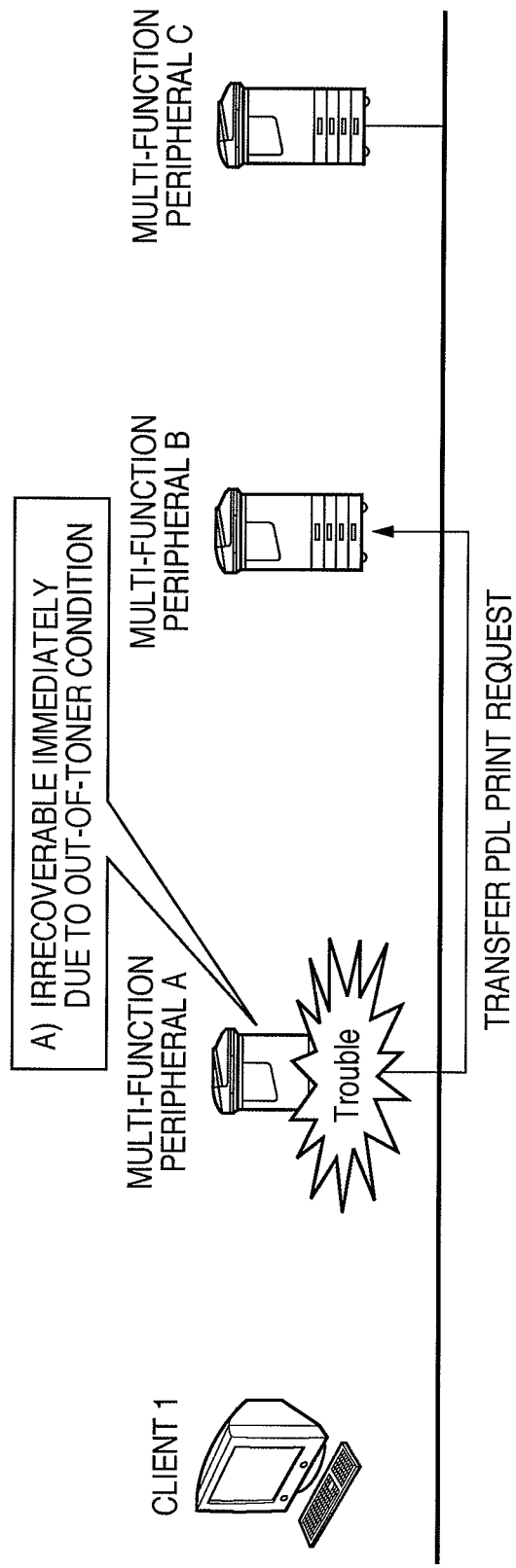
FIG. 6 is a diagram illustrating a situation in which multi-function peripheral A develops trouble in the typical printing environment in FIG. 5.

FIG. 4 is a block diagram showing inner details of the main controller 32 according to the present embodiment.

The bus controller 34 is made up of a 4-by-4, 64-bit crossbar switch and connected to the CPU 33 via a 64-bit processor bus (P bus). Also, the bus controller 34 is connected to a memory controller 69 equipped with a cache memory via a local bus (M bus) dedicated to memory. The memory controller 69 is connected with the ROM 36, DRAM 38, and other memories and controls their operation.

The bus controller 34 is connected with a G bus arbiter 71 and scanner/printer controller 72 via a graphic bus (G bus) 70. Also, the bus controller 34 is connected with a B bus arbiter 74, the G bus arbiter 71, and an interrupt controller 75 via an input/output bus (B bus) 73. Furthermore, the bus controller 34 is connected with various functional blocks including a power management unit 76, serial interface controller 77 such as UART, and USB controller 78. Furthermore, the bus controller 34 is connected with an IEEE 1284 or other interface controller 79, a LAN controller 80, a general-purpose input/output controller 81, a PCI bus interface 82 which interfaces between the B bus 73 and a PCI bus, and the scanner/printer controller 72.

The B bus arbiter 74 is an arbitrator which performs cooperative control of the B bus 73. Upon receiving a request to use the B bus 73, the B bus arbiter 74 gives permission to use the B bus 73 to one selected master after arbitration. This inhibits two or more masters from gaining bus access simultaneously. To conduct arbitration, three levels of priority are established, and each level of priority is assigned to a plurality of masters.

The interrupt controller 75 collects interrupts from outside the functional blocks and controller 9 described above and reassigns the interrupts to the controllers 72 and 77 to 82 and non-maskable interrupts (NMI) supported by the CPU 33.

The power management unit 76 manages electric power for each functional block and monitors an amount of power consumption of the controller 9 which is made up of a single chip. That is, the controller 9 is made up of a large-scale ASIC (application-specific IC) which contains the CPU 33. Consequently, if all the functional blocks operate simultaneously, a large amount of heat will be generated, which may destroy the controller 9 itself. To prevent such a situation, power consumption is managed for each functional block and the amount of power consumption of each functional block is accumulated as a power management level in the power management unit 76. Then, the power management unit 76 totals the amounts of power consumption of the functional blocks. The power management unit 76 manages the amount of power consumption of each functional block collectively so that the total amount of power consumption will not exceed a power consumption limit.

The G bus arbiter 71 performs cooperative control of the G bus 70 according to a central arbitration scheme and issues private request signals and permission signals to each bus master. Regarding bus access, bus masters are treated in either of two modes, fair arbitration mode and priority arbitration mode. In the fair arbitration mode, all the bus masters are granted bus access equally while in the priority arbitration mode, one of the bus masters is granted bus access preferentially.

Figure 11:
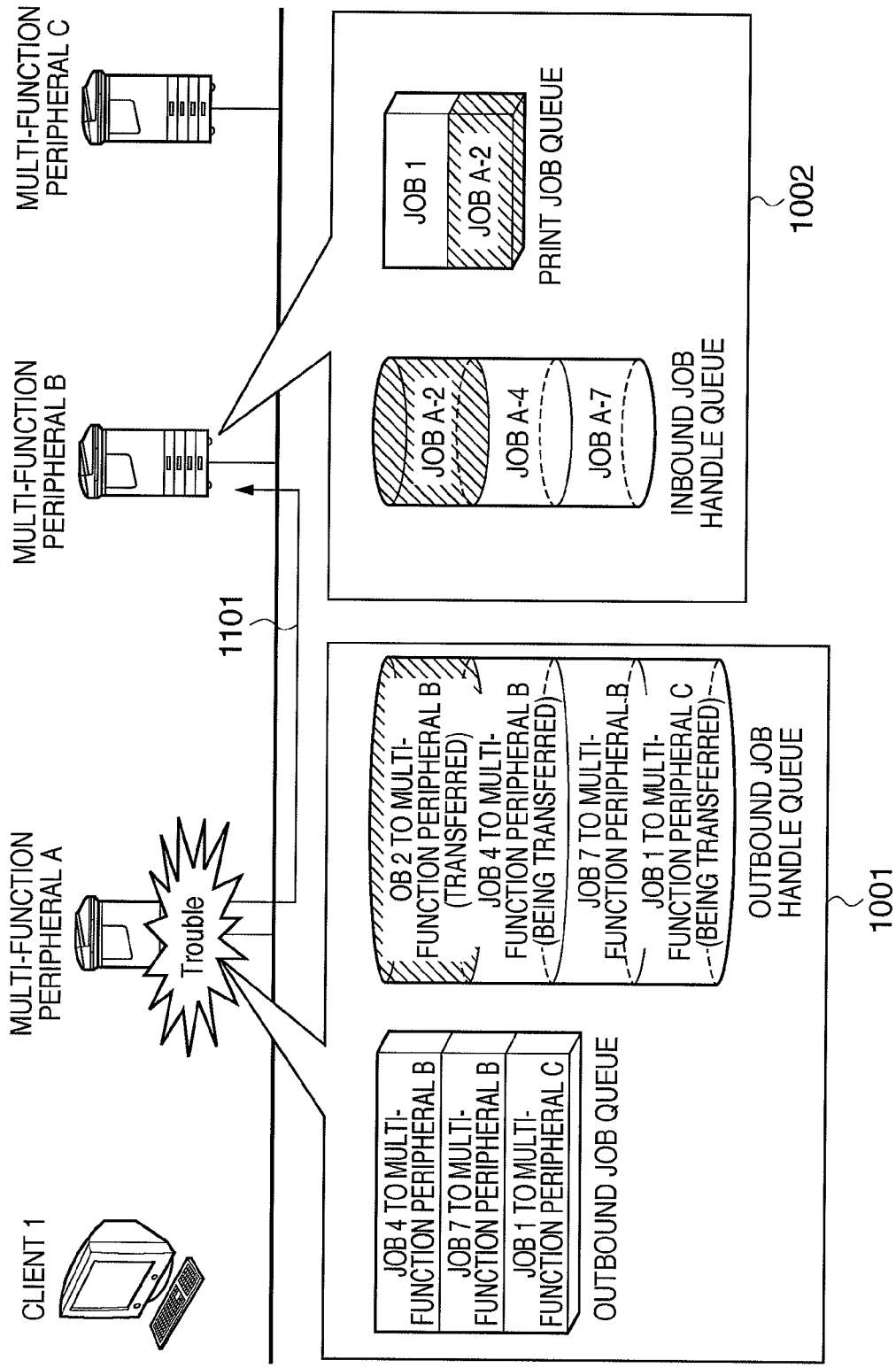
FIG. 11 is a diagram showing how a job on a transfer destination device (multi-function peripheral B) is controlled from a transfer source device (multi-function peripheral A) in the system according to the first embodiment of the present invention.
Figure 12:
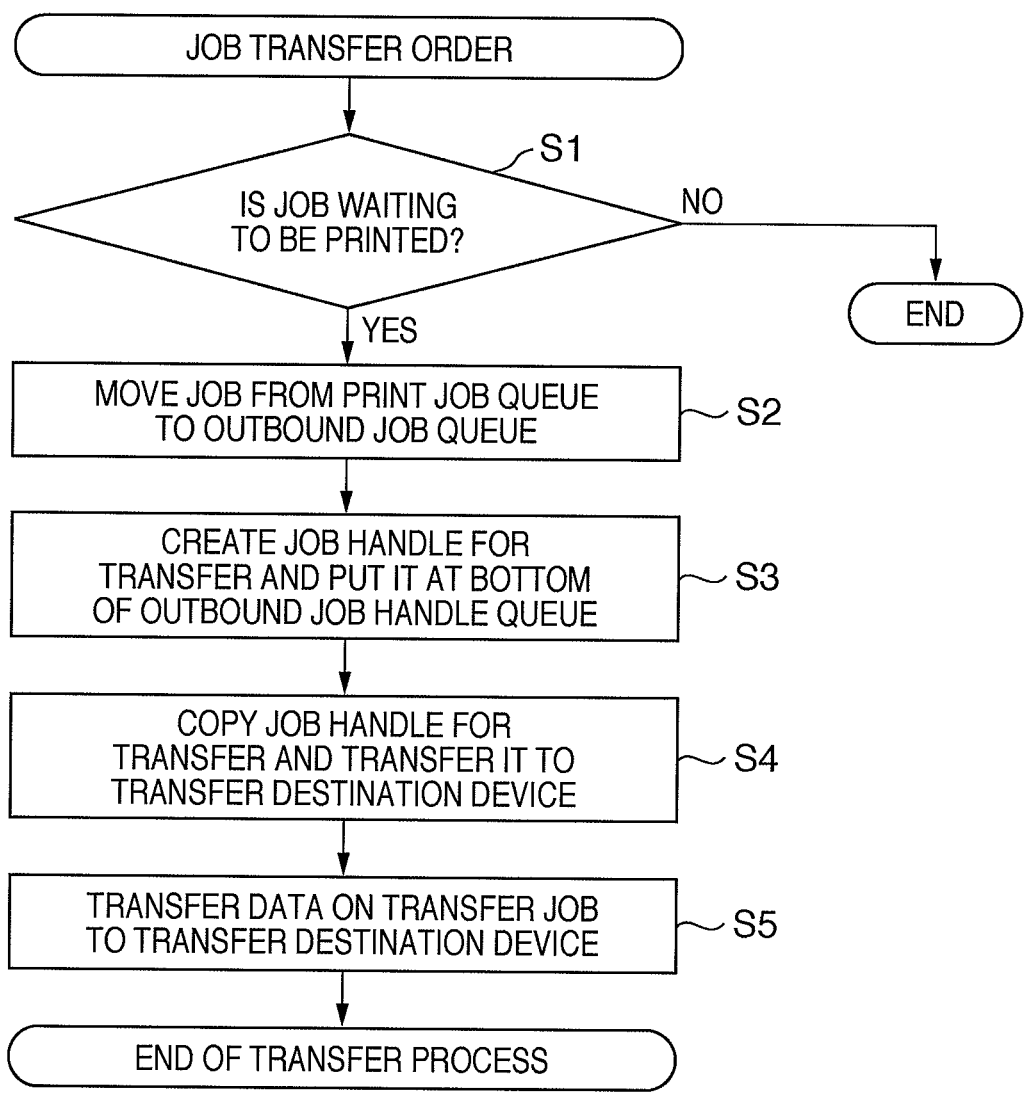
FIG. 12 is a flowchart illustrating a transfer process for a print job on an image input/output apparatus according to the first embodiment of the present invention.
Figure 13:
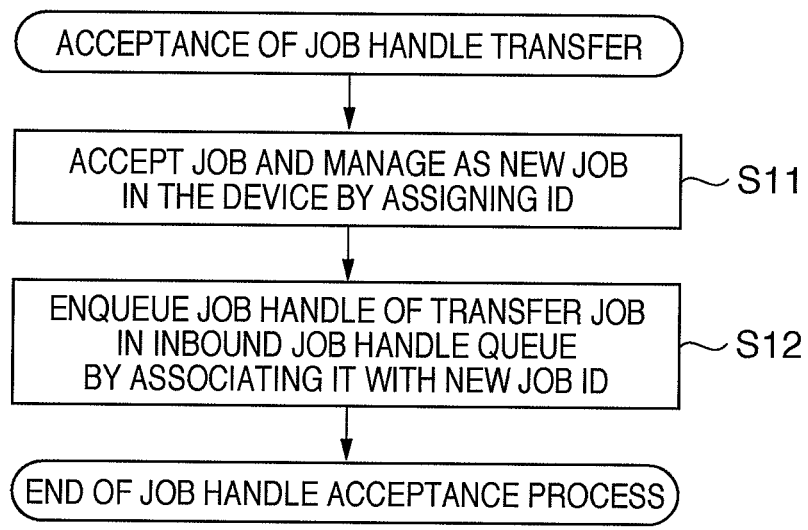
FIG. 13 is a flowchart illustrating reception process for a job handle on a multi-function peripheral of a transfer destination to which a print job has been transferred.
Figure 14:
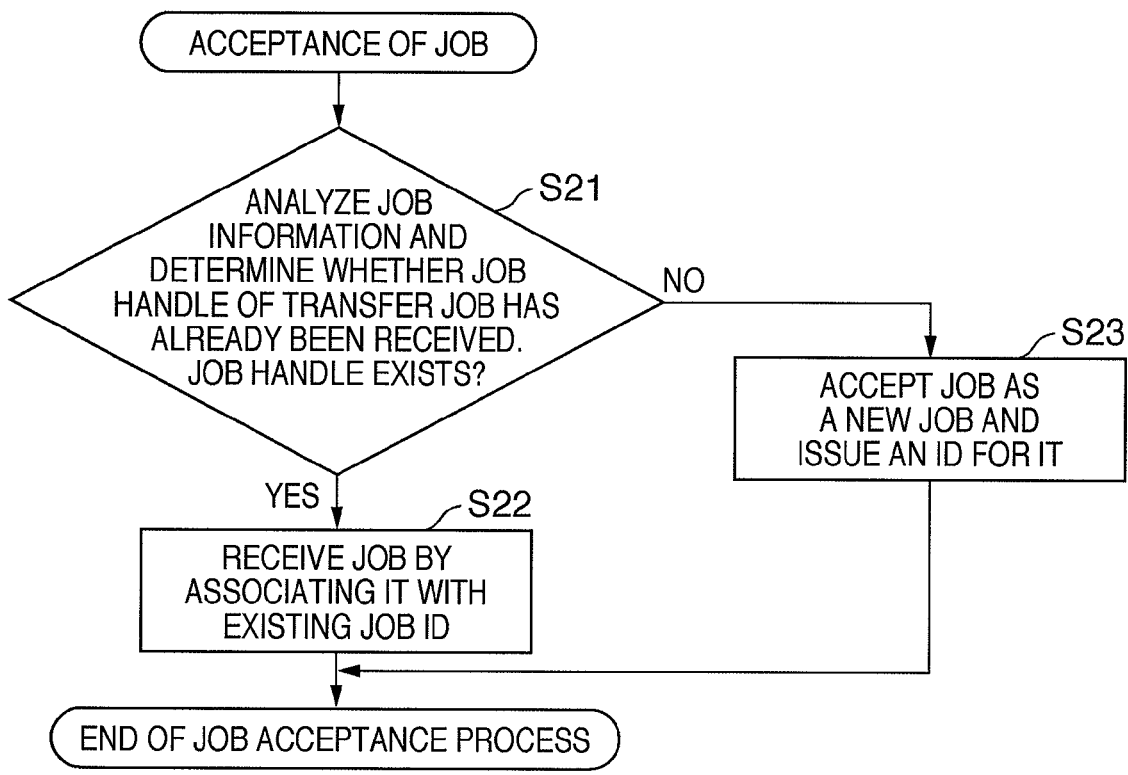
FIG. 14 is a flowchart illustrating the process of receiving a job arriving after a job handle.

Taking as an example the image input/output apparatus configured as described above, the present embodiment will be described with reference to FIGS. 7 to 11 and 15 as well as flowcharts in FIGS. 12 to 14, 16, and 17. To describe the present embodiment together with its advantages, FIGS. 7 to 11 show an example of overall configuration of a conceivable system as well as data flow and data structure according to the present embodiment. FIGS. 12 to 14 show flowcharts of control over transfer source and transfer destination devices in the case of transfer printing.

Processes of transfer printing which is a premise of the present embodiment will be described below mainly with reference to FIGS. 12 to 14. For convenience of illustration, it is assumed that all image input/output apparatus according to the present embodiment are multi-function peripherals which have the same configuration as the image input/output apparatus 1. However, other image input/output apparatus may be used as long as they are network-ready and capable of outputting visible images.

Figure 7:
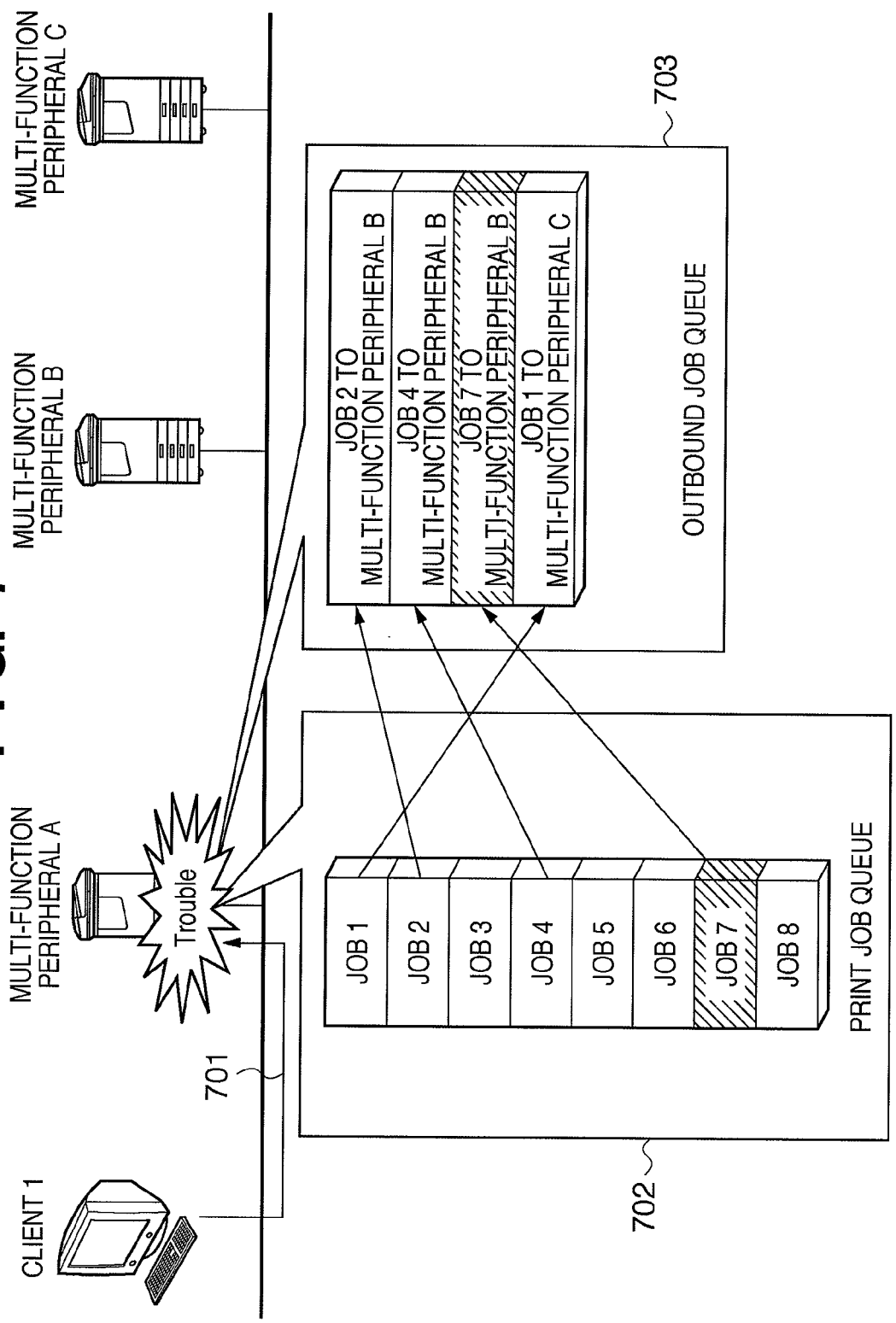
FIG. 7 is a diagram showing a situation in which multi-function peripheral A develops trouble in an information processing system according to the present embodiment.

FIG. 7 is a diagram showing a situation in which multi-function peripheral A develops trouble in an information processing system according to the present embodiment.

In FIG. 7, a print job 701 is issued by client 1 to multi-function peripheral A. A user name (user ID) of the job and corresponding password or an independent password for use to manipulate the job can be attached to the print job. Upon receiving the job, the CPU 33 of multi-function peripheral A stores the user name of the job and corresponding password in the DRAM 38 or on the hard disk drive 8a (or 8b) by associating them with an ID of the job. The print job may be transmitted in encrypted form. In that case, a password for use to decrypt the encrypted data may be attached as a job property to the job.

The CPU 33 of multi-function peripheral A enqueues the received job in a print job queue 702. The queue is managed by being stored in the DRAM 38 or on the hard disk drive 8a (or 8b). In FIG. 7, jobs 1 to 8 are stored in the queue 702 and are normally printed in the order in which they are stored.

Now it is assumed that trouble has occurred with multi-function peripheral A, rendering multi-function peripheral A incapable of printing. The trouble may be an out-of-toner condition, out-of-paper condition, or the like which can be fixed by the user or may be a part failure or the like which cannot be fixed without contacting a service company. In this case, the user who issues a print job to multi-function peripheral A can make settings by manipulating the console unit 7 of multi-function peripheral A so as to transfer the print job to another multi-function peripheral for printing. Incidentally, a print-job transfer order can be issued even when there is no trouble with a peripheral.

Job transfer orders may be allowed to be specified in advance for devices or jobs. For example, multi-function peripheral A may be set to transfer all print jobs received after "22:00" to multi-function peripheral B. Alternatively, print jobs input via a user PC may be set to be transferred to multi-function peripheral C if not executed 10 minutes after the input.

Reference numeral 703 denotes a queue of jobs ordered to be transferred. In this case, jobs 2, 4, 7 are set to be transferred to multi-function peripheral B while job 1 is set to be transferred to multi-function peripheral C.

Next, with reference to FIG. 12, description will be given of how a transfer source is controlled if a job transfer order (an event) is issued in FIG. 7, where the transfer source in this case is multi-function peripheral A which is an image input/output apparatus.

FIG. 12 is a flowchart illustrating a transfer process for a print job on the image input/output apparatus according to the present embodiment. The program which executes the flowchart is stored in the DRAM 38 during run time and executed under the control of the CPU 33.

Upon receiving a job transfer order, the CPU 33 of multi-function peripheral A determines in Step S1 whether the job is waiting to be printed, being placed in the queue 702. If the job is not waiting to be printed (NO in Step S1), meaning that the job is being printed or the job does not exist on multi-function peripheral A because the job has already been printed, the CPU 33 finished processing without transferring the job.

If it is determined in Step S1 that the job is waiting to be printed (YES in Step S1), the CPU 33 goes to Step S2. In Step S2, the CPU 33 moves the job from the print job queue 702 to the outbound job queue 703. The CPU 33 manages four queues: the print job queue, the outbound job queue, an outbound job handle queue, and an inbound job handle queue. In the print job queue, the CPU 33 manages jobs waiting to be printed on the local device (multi-function peripheral A). In the outbound job queue, the CPU 33 manages jobs set to be transferred and waiting to be transferred from the local device. In the outbound job handle queue, the CPU 33 manages a queue of job handles of the jobs set to be transferred from the local device. Furthermore, in the inbound job handle queue, the CPU 33 manages a queue of job handles transferred from other devices.

In the example of FIG. 7, job 2 with a job ID of "2," job 4 with a job ID of "4," and job 7 with a job ID of "7" are set to be transferred to multi-function peripheral B. On the other hand, job 1 with a job ID of "1" is set to be transferred to multi-function peripheral C. The jobs are enqueued in order in the outbound job queue 703.

Figure 8:
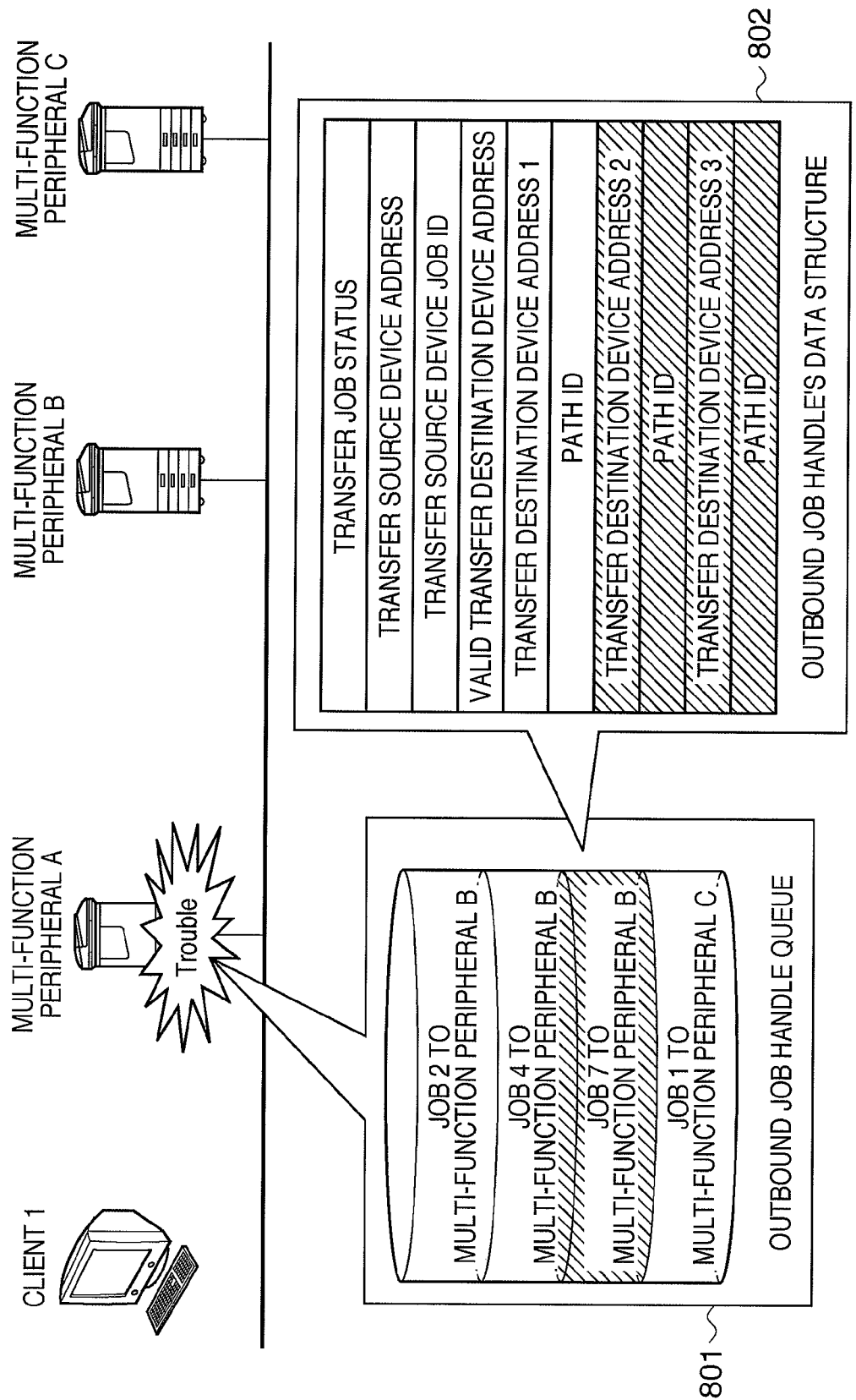
FIG. 8 is a diagram showing a situation in which a job handle is created in Step S3 in FIG. 12.

After moving the job between the queues in Step S2, the CPU 33 goes to Step S3 where the CPU 33 creates a job handle for use in transferring the job and enqueues the job handle in the outbound job handle queue 801 (see FIG. 8). State of the job handle is shown in "outbound job handle's data structure" 802 in FIG. 8.

FIG. 8 is a diagram showing the job handle created in Step S3 in FIG. 12.

In FIG. 8, job handles of transfer jobs are stored in the outbound job handle queue 801 in the order of requests from the user.

As shown in 802, the data structure of handle data includes Transfer Job Status, Transfer Source Device Address, Transfer Source Device Job ID, and Valid Transfer Destination Device Address. Besides, the data structure includes Transfer Destination Device Address 1, Transfer Destination Device Address 2, Transfer Destination Device Address 3, and so on as well as their Path ID. Job handle data of job 7 in multi-function peripheral A will be described, as an example.

Available values of Transfer Job Status, which is used to manage a transfer job, include Initial State, Received, Transfer Wait, and Transferred. Since multi-function peripheral A is waiting for a job received from client 1 to be transferred, Transfer Job Status is set to Transfer Wait.

Transfer Source Device Address and Transfer Source Device Job ID are set to the IP address of multi-function peripheral A, which is the transfer source of the job. Also, Transfer Source Device Job ID is set to "7" which is the job ID of job 7.

Valid Transfer Destination Device Address is set to the address of multi-function peripheral B, which is the transfer destination. The same address is entered in Transfer Destination Device Address 1. Transfer Destination Device Address 2 and subsequent items contain variable-length data. Information about how to use these items will be provided later. In the case of multi-function peripheral A shown in FIG. 8, no additional address is specified because there is no additional address. Each transfer destination device address is always followed by an appropriate path ID. Information about how to use the path ID will be provided in a second embodiment described later. The path ID is initialized to "1" in this case.

The job handle of the transfer job is held at the bottom of the outbound job handle queue in the given device. The job handle is partially altered by the CPU 33 when the job is transferred to another device.

In Step S4, the CPU 33 copies the job handle created in Step S3 and transfers it to the transfer destination device. Before transferring the job, the CPU 33 alters Transfer Job Status of the copied job handle to Initial State).

Figure 9:
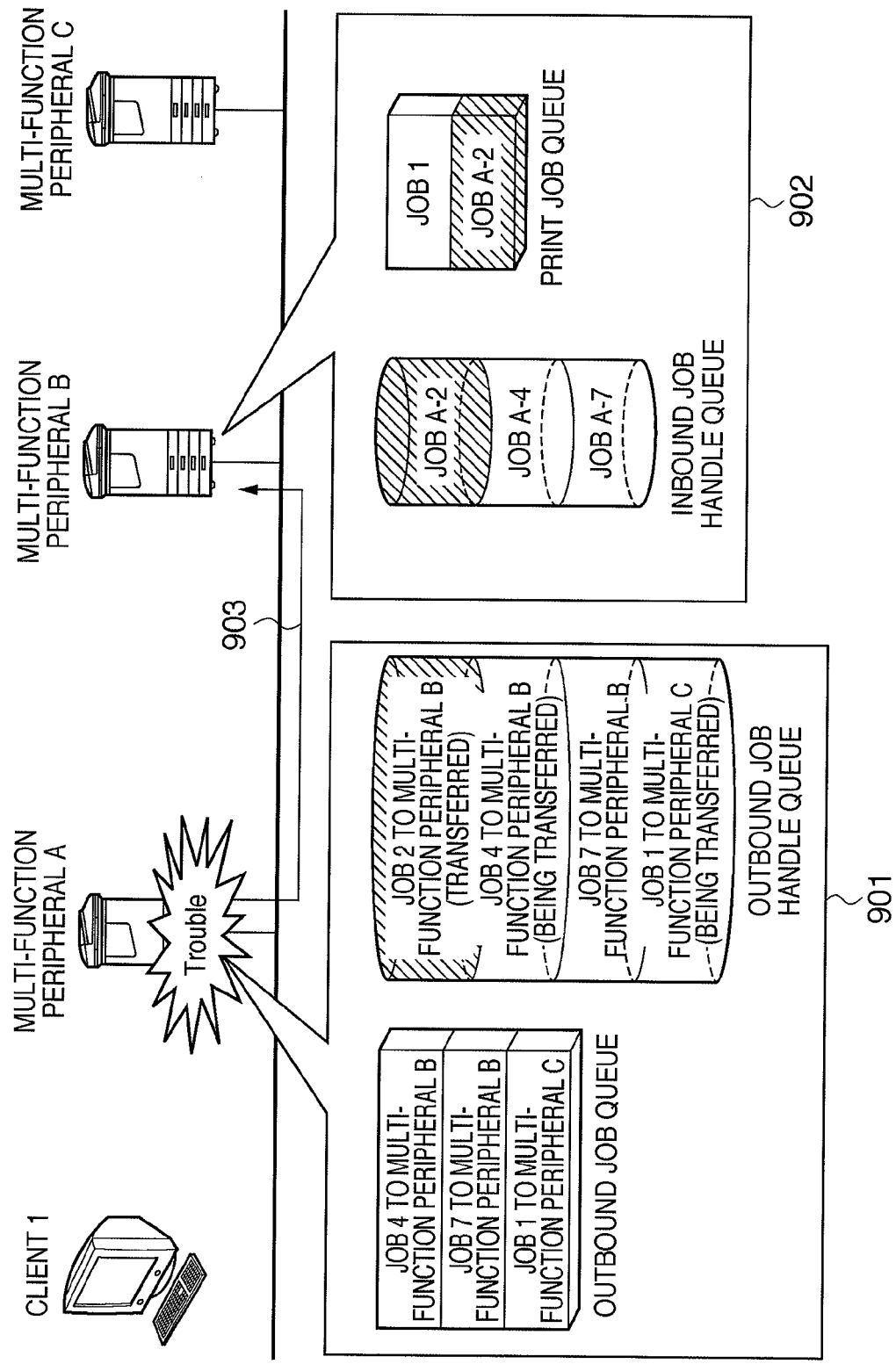
FIG. 9 is a diagram showing a job queue and job handle queue in a transfer source device and transfer destination device during transfer printing according to the present embodiment.

In Step S5, the CPU 33 transfers data on the transfer job to the transfer destination device (903 in FIG. 9).

Referring to FIG. 9, when job 2 has been transferred to multi-function peripheral B, job 2 is deleted from the outbound job queue on multi-function peripheral A. Also, Transfer Job Status of job 2 in the outbound job handle queue is changed to Transferred (901).

This concludes the description of the operation of the transfer source (multi-function peripheral A) for a job transfer.

Next, operation of a transfer destination device (multi-function peripheral B) will be described with reference to FIGS. 13 and 14 by taking as an example, control performed by the CPU 33 of multi-function peripheral B.

FIG. 13 is a flowchart illustrating reception process for a job handle on a multi-function peripheral of a transfer destination to which a print job has been transferred.

FIG. 14 is a flowchart illustrating the process of receiving a job arriving after a job handle. The program which executes the flowcharts is stored in the DRAM 38 during run time and executed under the control of the CPU 33.

The process in FIG. 13 is started when the CPU 33 of multi-function peripheral B receives a job handle. In Step S11, after receiving the job handle, the CPU 33 of multi-function peripheral B assigns a job ID to the job as a new job in the device. In Step S12, the CPU 33 sets Valid Transfer Destination Device Address in the handle of the transfer job to "0" and enqueues the job handle in the inbound job handle queue (902 in FIG. 9).

Next, the process of receiving a job will be described with reference to FIG. 14.

In Step S21, the CPU 33 analyzes job information and determines, with reference to the inbound job handle queue 902, whether the job handle of the transfer job has already been received. If it is found that the job handle has already been received (YES in Step S21), the CPU 33 goes to Step S22 to handle the job as a transfer job. In Step S22, the CPU 33 manages the received job handle and the corresponding job ID by associating them with each other and enqueues the job in the print job queue (902 in FIG. 9).

On the other hand, if it is determined in Step S21 that no job handle has been received (NO in Step S21), the CPU 33 goes to Step S23 to issue an ID by treating the job as a new job, enqueues the job in the print job queue, and thereby finishes processing. This concludes the description of the operation of the transfer destination device (multi-function peripheral B in this case).

Based on the transfer-print control sequence described above, description will be given of a typical embodiment of the present invention, that is, procedures for allowing a transfer job to be manipulated from both transfer source and transfer destination devices.

First Embodiment

Figure 10:
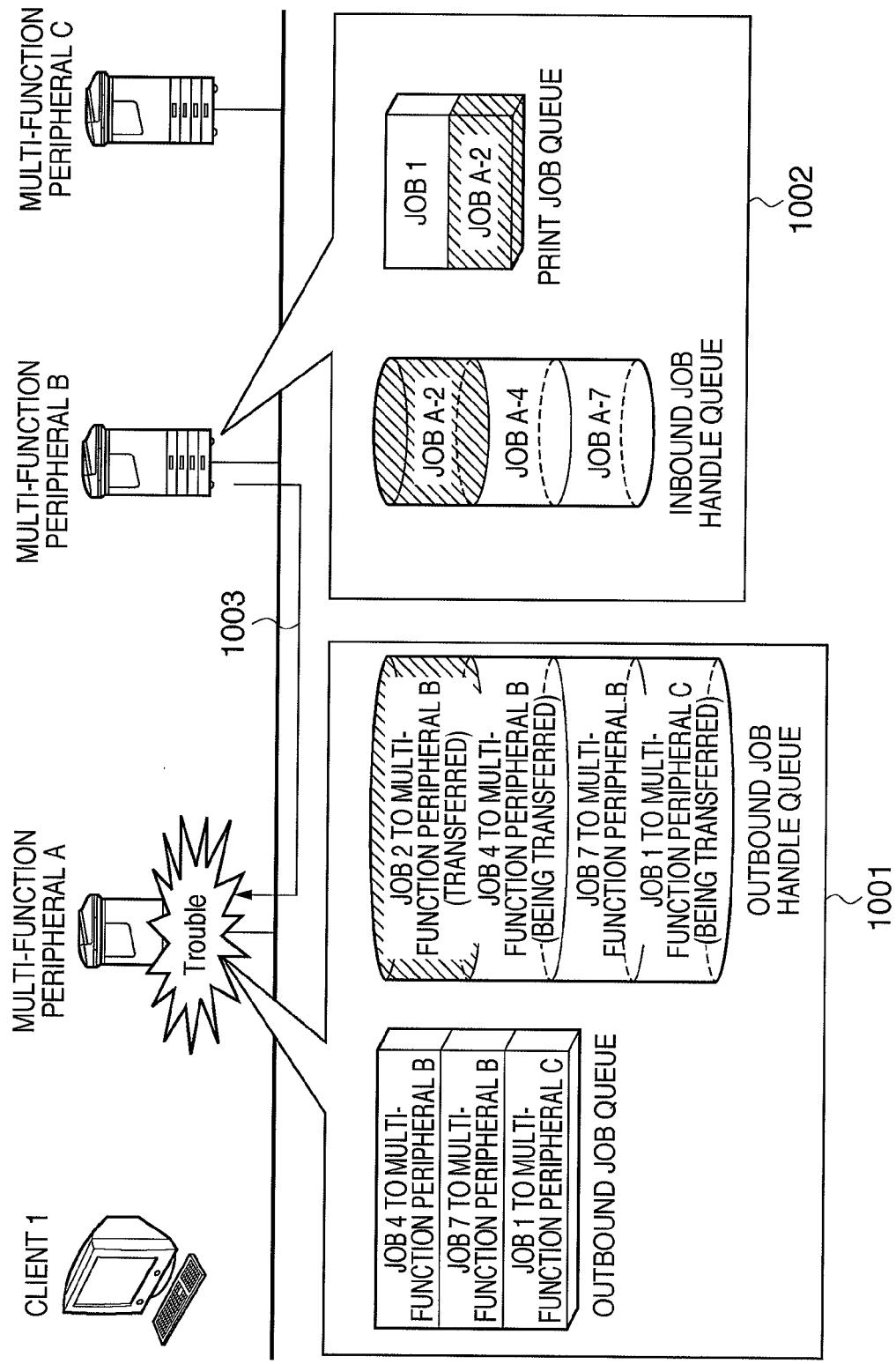
FIG. 10 is a diagram showing how a job on a transfer source device (multi-function peripheral A) is controlled from a transfer destination device (multi-function peripheral B) in a system according to a first embodiment of the present invention.

FIG. 10 is a diagram showing a configuration of an information processing system (printing system) according to the first embodiment. FIG. 10 shows how a job on a transfer source device (multi-function peripheral A) is controlled from a transfer destination device (multi-function peripheral B). FIG. 11 is a diagram showing how a job on a transfer destination device (multi-function peripheral B) is controlled from a transfer source device (multi-function peripheral A) in the information processing system according to the first embodiment of the present invention.

In FIG. 10, trouble has occurred with multi-function peripheral A, and consequently job 4 and job 7 are set to be transferred to multi-function peripheral B and job 1 is set to be transferred to multi-function peripheral C. Reference numeral 1001 denotes state of a queue on multi-function peripheral A and 1002 denotes state of a queue on multi-function peripheral B. Job 2 has been transferred to multi-function peripheral B, job 4 is being transferred to multi-function peripheral B, and job 1 is being transferred to multi-function peripheral C. On multi-function peripheral B, job 2 which has been transferred is enqueued in a print job queue. In this state, if the user enters a job control request in multi-function peripheral B, requesting the processing of job 7 to be cancelled, multi-function peripheral B issues a control request for job 7 to multi-function peripheral A of the transfer source in 1003. The job control request includes a job cancellation request, job transfer cancellation request, job password change request, and job transfer destination change request.

In FIG. 11, trouble has occurred with multi-function peripheral A, and consequently job 4 and job 7 are set to be transferred to multi-function peripheral B and job 1 is set to be transferred to multi-function peripheral C. Job 2 has been transferred to multi-function peripheral B, job 4 is being transferred to multi-function peripheral B, and job 1 is being transferred to multi-function peripheral C. On multi-function peripheral B, job 2 which has been transferred is enqueued in a print job queue. In this state, if the user enters a job control request in multi-function peripheral A, requesting the processing of job 2 to be cancelled, multi-function peripheral A issues a control (cancel) request for job 2 to multi-function peripheral B of the transfer destination in 1101. The job control request includes a job cancellation request, job transfer cancellation request, job password change request, and job transfer destination change request.

Job cancellation control according to the first embodiment will be described with reference to a sequence diagram in FIG. 15 and flowcharts in FIGS. 16 and 17.

Figure 15:
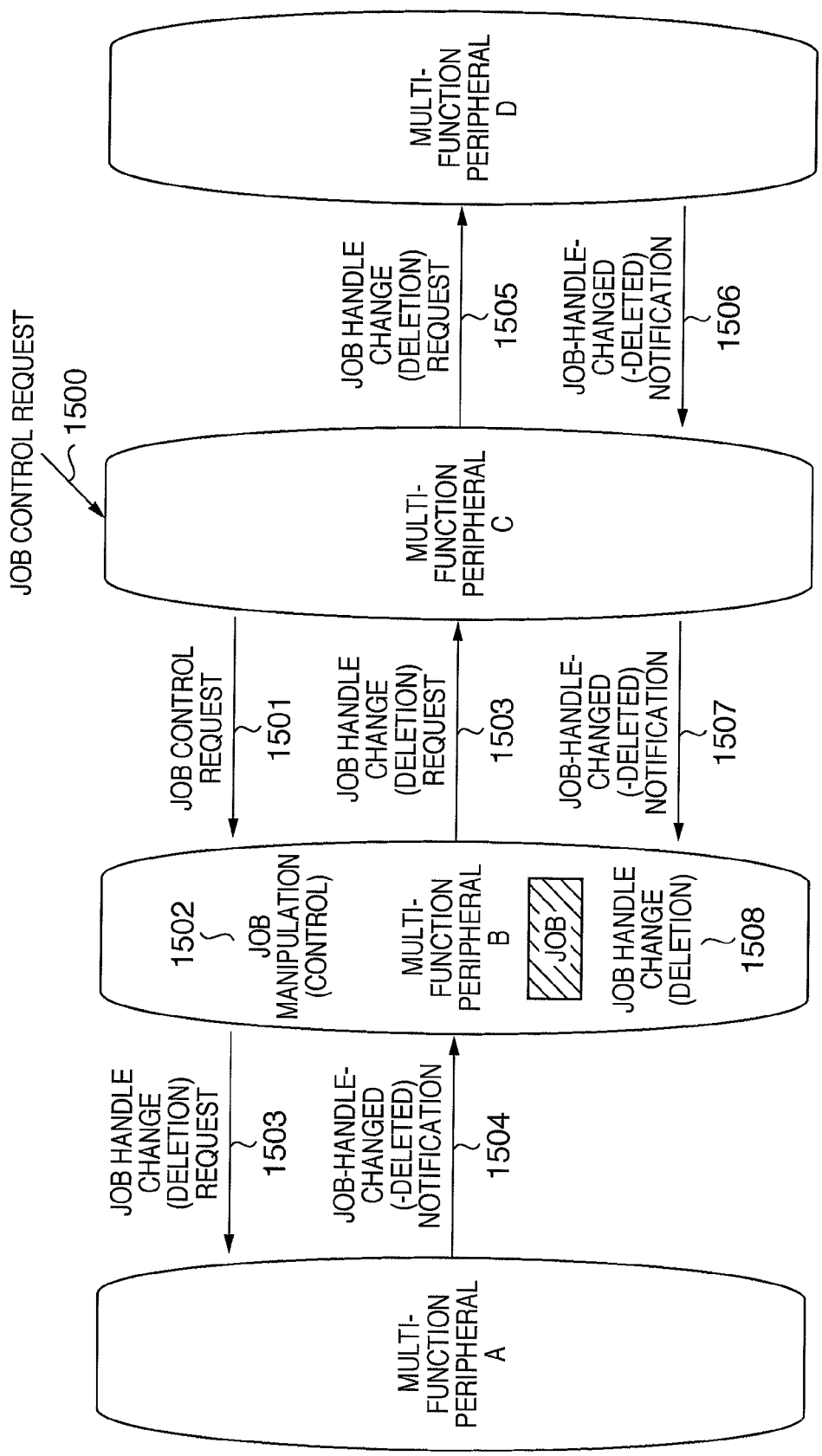
FIG. 15 is a sequence diagram illustrating control over a transfer job among a plurality of multi-function peripherals according to the first embodiment of the present invention.

FIG. 15 is a sequence diagram illustrating control over a transfer job among a plurality of multi-function peripherals according to the first embodiment of the present invention.

The control over a transfer job is performed using the job handle data described above. The control involves a processing flow such as represented by the sequence in FIG. 15. In the example of FIG. 15, a job generated in multi-function peripheral A is transferred to multi-function peripheral B. Then, transfer requests are issued from multi-function peripheral B to multi-function peripheral C and then from multi-function peripheral C to multi-function peripheral D.

In 1500, a job control request, that is, a request to cancel the job (hereinafter a job cancellation request) according to the present embodiment, is issued to multi-function peripheral C. Next, in 1501, a job cancellation request is issued form multi-function peripheral C to multi-function peripheral B.

At this time, multi-function peripheral C can refer to Transfer Job Status in the appropriate job handle and thereby determine that the job has not reached multi-function peripheral C yet. Thus, multi-function peripheral C issues a job control request to multi-function peripheral B of the transfer source. Consequently, multi-function peripheral B manipulates the job, that is, cancels the job (1502). The job is waiting to be transferred on multi-function peripheral B. However, once the job is cancelled, it is neither transferred nor printed. After canceling the job, multi-function peripheral B issues a request to delete the job handle to multi-function peripheral A of the job transfer source and multi-function peripheral C of the job transfer destination. Consequently, multi-function peripheral A deletes the job handle. Then, in 1504, multi-function peripheral A notifies multi-function peripheral B that the job handle has been deleted.

Upon receiving the job handle deletion request 1503, multi-function peripheral C issues a job handle deletion request to multi-function peripheral D of the job transfer destination (1505). Consequently, multi-function peripheral D deletes the job handle, and then returns a job-handle-deleted notification to multi-function peripheral C in 1506. Upon receiving the job-handle-deleted notification from multi-function peripheral D, multi-function peripheral C deletes the job handle. Then, multi-function peripheral C notifies multi-function peripheral B about the deletion of the job handle (1507). Upon receiving the job-handle-deleted notifications 1504 and 1507 from multi-function peripheral C of the transfer destination and multi-function peripheral A of the transfer source, respectively, multi-function peripheral B deletes the job handle in 1508 and thereby finishes processing.

In this way, when the user enters a job control request in one of the multi-function peripherals, a job control request is issued to the device on which the job exists along a job transfer path. Consequently, the device on which the job exists processes the job and issues a request to change or delete the job handle to the transfer source device and transfer destination device. Then, the transfer source device and transfer destination device transmit a job handle change request along the job transfer path, and upon reception of a response, manipulate the job handle on the local device and notify the requester about successful change or deletion of the job handle. Upon receiving the notifications about the successful manipulation of the job handle from the transfer source device and transfer destination device, the device on which the job exists deletes the job handle on the local device.

Execution of the sequence by the devices among which the job handle is transferred makes it possible to process a job cancellation request from any of the transfer source and transfer destination devices. Actual operation of the devices will be described with reference to the flowcharts in FIGS. 16 and 17.

Figure 16:
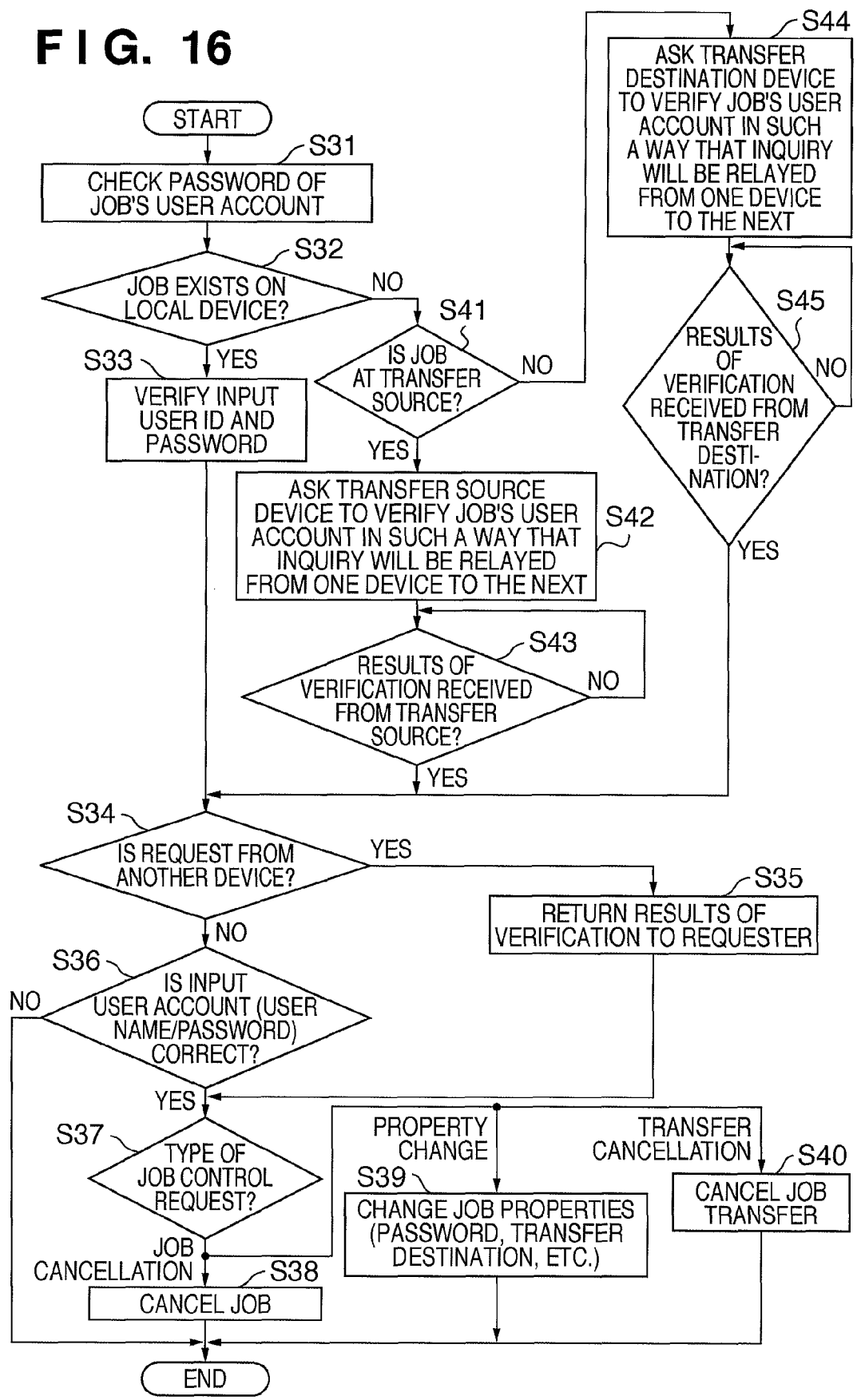
FIG. 16 is a flowchart illustrating control over a transfer job according to the first embodiment of the present invention.

FIG. 16 is a flowchart illustrating control over a transfer job according to the first embodiment. Operation of the CPU 33 of a multi-function peripheral is described here, assuming that the multi-function peripheral has received a job control request from the user, transfer source device, or transfer destination device. The program which executes the flowchart is stored in the DRAM 38 during run time and executed under the control of the CPU 33.

Upon receiving a job cancellation request, the CPU 33 of the multi-function peripheral accepts inputs of the job's user ID and password and a confirmation request thereof via the console unit 7. A user account of the job can be set up as an option when the job is input. The user account is stored as a job property in the HDD 8a or 8b. When a match between the user name and account is confirmed, the user is allowed to manipulate the job.

Upon accepting inputs of a user ID and password in Step S31, the CPU 33 determines whether the job exists on the local device in Step S32. If the job exists on the local device (YES in Step S32), the CPU 33 goes to Step S33. Otherwise (NO in Step S32), the CPU 33 goes to Step S41.

In Step S33, the CPU 33 determines the user ID and password input in Step S31 against a user name and password which are job properties to see whether the input user ID and password are correct. In Step S34, the CPU 33 determines whether the request to confirm the user account and password is from another device. If it is (YES in Step S34), the CPU 33 goes to Step S35 to notify the requester of results. In this case, if authentication is successful, the CPU 33 goes to Step S37 because there may be a request for job manipulation from the requester.

On the other hand, if it is determined in Step S34 that the requester is the console unit 7 of the local device (NO in Step S34), the CPU 33 goes to Step S36 to determine whether the user account has been authenticated successfully. If it is determined that the user account has been authenticated successfully (YES in Step S36), the CPU 33 goes to Step S37 to wait for a job processing request.

On the other hand, if it is determined in Step S32 that the job does not exist on the local device (NO in Step S32), the CPU 33 goes to Step S41. In Step S41, the CPU 33 determines, with reference to Transfer Job Status in the job handle, whether the job is located on the transfer source device or transfer destination device. If the job is located on the transfer source device, (YES in Step S41), the CPU 33 goes to Step S42 to ask the transfer source device to verify the job's user account. When asked to verify the user account, the transfer source device refers to the job handle. If necessary, the transfer source device further asks the previous transfer source device to verify the job's user account (this corresponds to the processes in the steps beginning with Step S31). In Step S43, the CPU 33 waits for results of verification to be received from the transfer source device. When results of verification are received (YES in Step S43), the CPU 33 goes to Step S34. Since Step S34 and subsequent steps have already been described above, description thereof will be omitted.

If it is determined in Step S41 that the job is located on the transfer destination device (NO in Step S41), the CPU 33 goes to Step S44 to ask the transfer destination device to determine the job's user account in such a way that the inquiry will be relayed from one device to the next. When asked to verify the user account, the transfer destination device refers to the job handle. If necessary, the transfer destination device further ask the next transfer destination device to verify the job's user account (this corresponds to the processes in the steps beginning with Step S31). In Step S45, the CPU 33 waits for results of verification to be received from the transfer destination device. When results of verification are received (YES in Step S45), the CPU 33 goes to Step S34. Since Step S34 and subsequent steps have already been described above, description thereof will be omitted.

In Step S37, the CPU 33 waits for a job control request, and then goes to Step S38 (job cancellation), Step S39 (job property change), or Step S40 (job transfer cancellation) according to the job control request. If anything other than a job control request is input, the CPU 33 returns to Step S37.

Figure 17A:
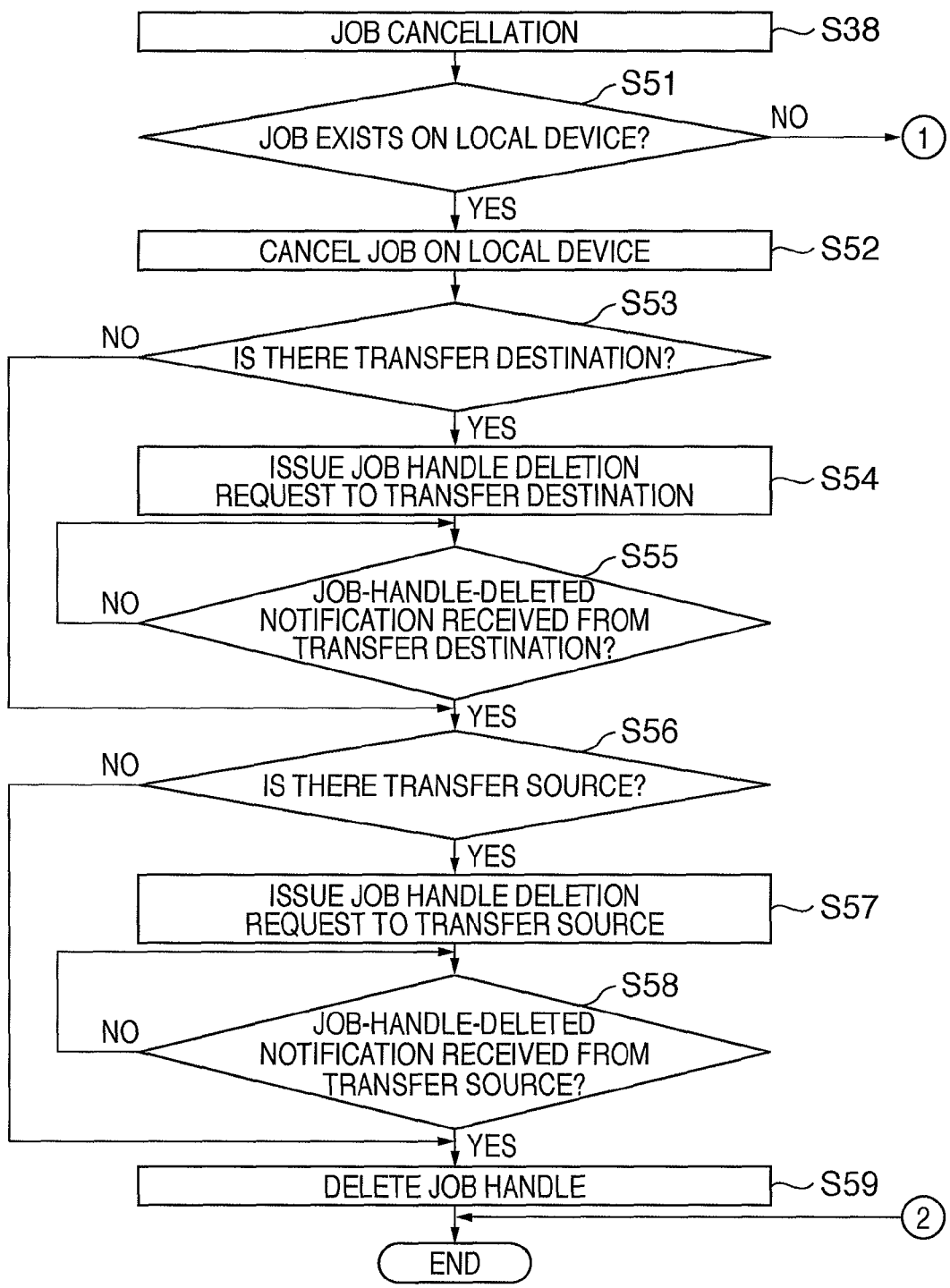
FIGS. 17A and 17B are flowcharts illustrating job cancellation control in Step S38 in FIG. 16.
Figure 17B:
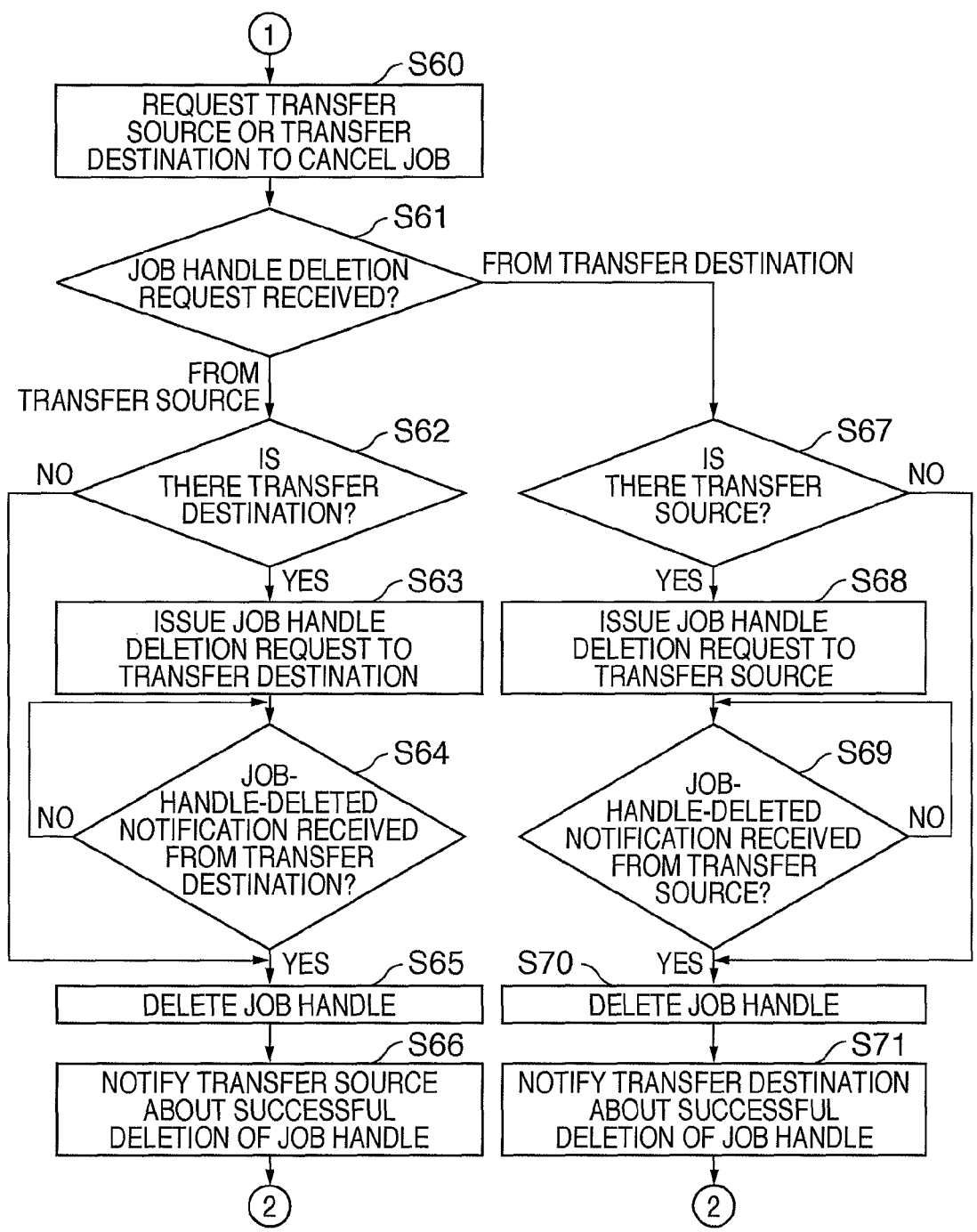

FIGS. 17A and 17B are flowcharts illustrating job cancellation control in Step S38 in FIG. 16.

Upon receiving a job cancellation request, the CPU 33 determines in Step S51 whether the job exists on the local device. If it is determined in Step S51 that the job exists on the local device (YES in Step S51), the CPU 33 goes to Step S52. Otherwise (NO in Step S51), the CPU 33 goes to Step S60. In Step S52, the CPU 33 cancels the job existing on the local device. In Step S53, the CPU 33 determines the outbound job handle queue to see whether a transfer destination has been specified for the job. If a transfer destination has been specified (YES in Step S53), the CPU 33 goes to Step S54. Otherwise (NO in Step S53), the CPU 33 goes to Step S56. In Step S54, the CPU 33 issues a request to delete the job handle to the transfer destination device. The transfer destination device issues a job handle deletion request to the next transfer destination, proceeding from one to the next according to the sequence in FIG. 15 until the job is located. Once the job handle is deleted, the transfer destination device notifies the requester about successful deletion of the job handle. Thus, the CPU 33 waits for a job-handle-deleted notification from the transfer destination device in Step S55.

If a job-handle-deleted notification is received from the transfer destination device in Step S55 (YES in Step S55), the CPU 33 goes to Step S56 to determine whether there is a transfer source of the job with reference to the job handle. If there is a transfer source (YES in Step S56), the CPU 33 goes to Step S57. Otherwise (NO in Step S56), the CPU 33 goes to Step S59. In Steps S57 and S58, the CPU 33 performs the same processes as in Steps S54 and S55 with respect to the transfer source device. If a job-handle-deleted notification is received from the transfer source device, the CPU 33 goes to Step S59 where the CPU 33 deletes the job handle and thereby finishes processing.

Incidentally, the processes in Steps S57 and S58 and processes in Steps S54 and S55 can and may be performed simultaneously depending on software structure of the CPU 33. In the present embodiment, these processes are described in sequence for convenience of explanation.

Next, processes which take place when the job does not exist on the local device (NO in Step S51) will be described with reference to Step S60 and subsequent steps.

In Step S60, since the job does not exist on the local device, the CPU 33 requests the transfer source device or transfer destination device on whichever the job exists to cancel the job. To determine to which to send the request, the transfer source or transfer destination, the CPU 33 refers to Transfer Job Status in the job handle. When the CPU 33 requests cancellation of the job, the device which holds the job issues a request to delete the job handle of the transfer job (see the sequence in FIG. 15). Consequently, in Step S61, the CPU 33 waits for a job handle deletion request to be received. If a job handle deletion request is received from the transfer source device ("from transfer source" in Step S61), the CPU 33 goes to Step S62. If a job handle deletion request is received from the transfer destination device ("from transfer destination" in Step S61), the CPU 33 goes to Step S67.

In Steps S62 and S67, the CPU 33 determines whether there is an additional transfer destination and transfer source, respectively. If there is another transfer destination or transfer source, the CPU 33 goes to Step S63 or S68 to issue a job handle deletion request. After that, the CPU 33 waits for a job-handle-deleted notification in Step S64 or S69. Once a job-handle-deleted notification is received, the CPU 33 deletes the job handle in the local device in S65 or Step S70. Then, the CPU 33 goes to Step S66 or S71 where the CPU 33 notifies the requester about the successful deletion of the job handle and thereby finishes processing.

Thus, according to the first embodiment, even after a job is transferred, the user can cancel the job by giving an order for a job cancellation process from any of the transfer source and transfer destination devices.

Second Embodiment

In the first embodiment, cancellation of a job has been described as an example of job control. In another example of job control, it is conceivable to alter job properties by manipulation from a transfer destination device or transfer source device during a job transfer. Possible examples of property alteration include a password change and a change of a preset transfer destination.

In the second embodiment, a job property alteration process will be described with reference to a flowchart in FIG. 18 and to FIG. 19. Processes performed in the flowchart of FIG. 16 are also performed in the second embodiment. Also, the devices have the same configuration as the multi-function peripheral according to the first embodiment, and thus a description thereof will be omitted.

Processes unique to the second embodiment are started when the CPU 33 goes to Step S39 after finding in Step S37 in FIG. 16 that there is a request to alter job properties.

Figure 18:
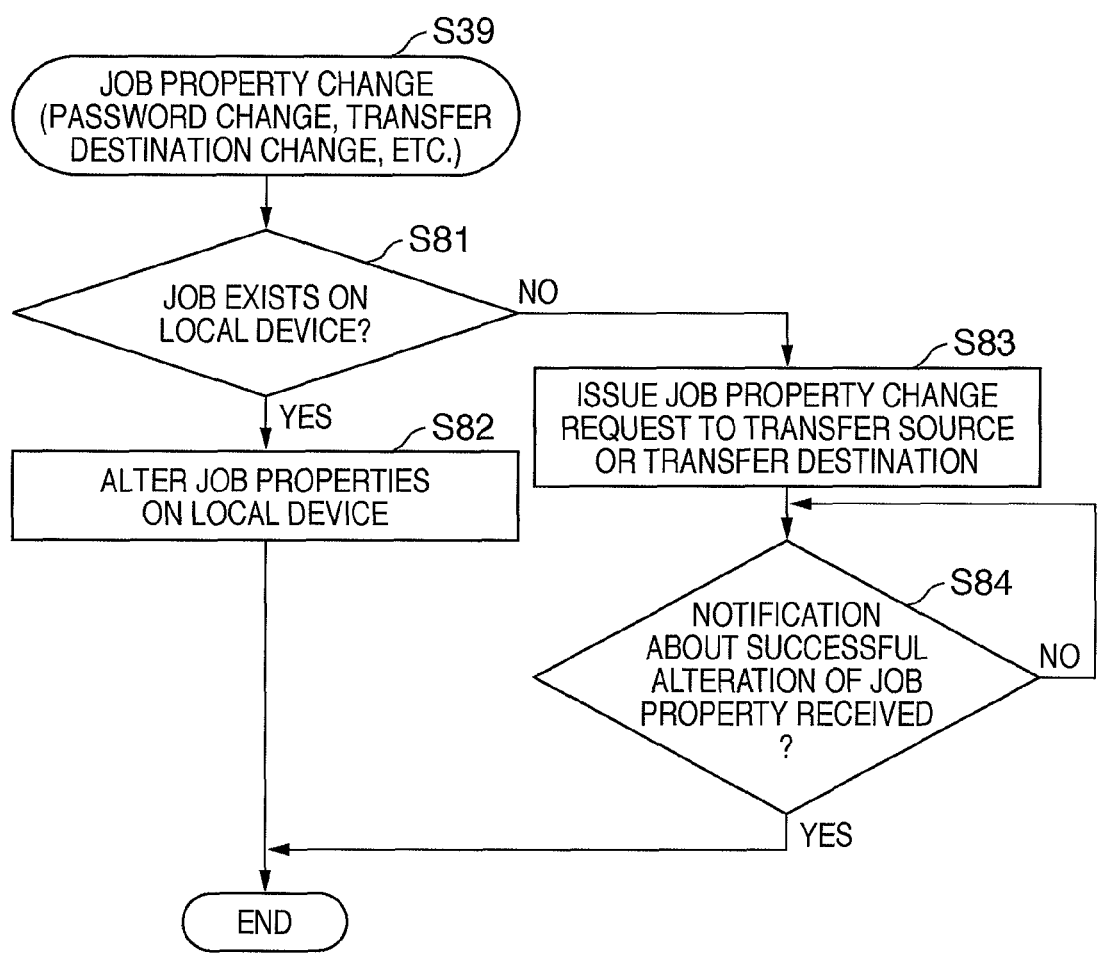
FIG. 18 is a flowchart illustrating a job property change process (Step S39 in FIG. 16) according to a second embodiment of the present invention.

FIG. 18 is a flowchart illustrating a job property change process (Step S39 in FIG. 16) according to the second embodiment.

In Step S81, the CPU 33 determines whether the job exists on the local device. If it is determined that the job exists on the local device (YES in Step S81), the CPU 33 goes to Step S82 to alter job properties. Otherwise (NO in Step S81), the CPU 33 goes to Step S83 to issue a job property change request to the transfer source device or transfer destination device on whichever the job exists. To determine in which direction to send the request, the CPU 33 refers to Transfer Job Status in the job handle. The device which receives the job property change request performs processes of Step S81 and subsequent steps in FIG. 18. That is, the request continues to be transferred until it reaches the device on which the job exists.

In Step S84, the CPU 33 which has issued the job property alteration request in Step S83 finishes the processing when the CPU 33 receives a notification about successful alteration of the job property (YES in Step S84).

Figure 19:
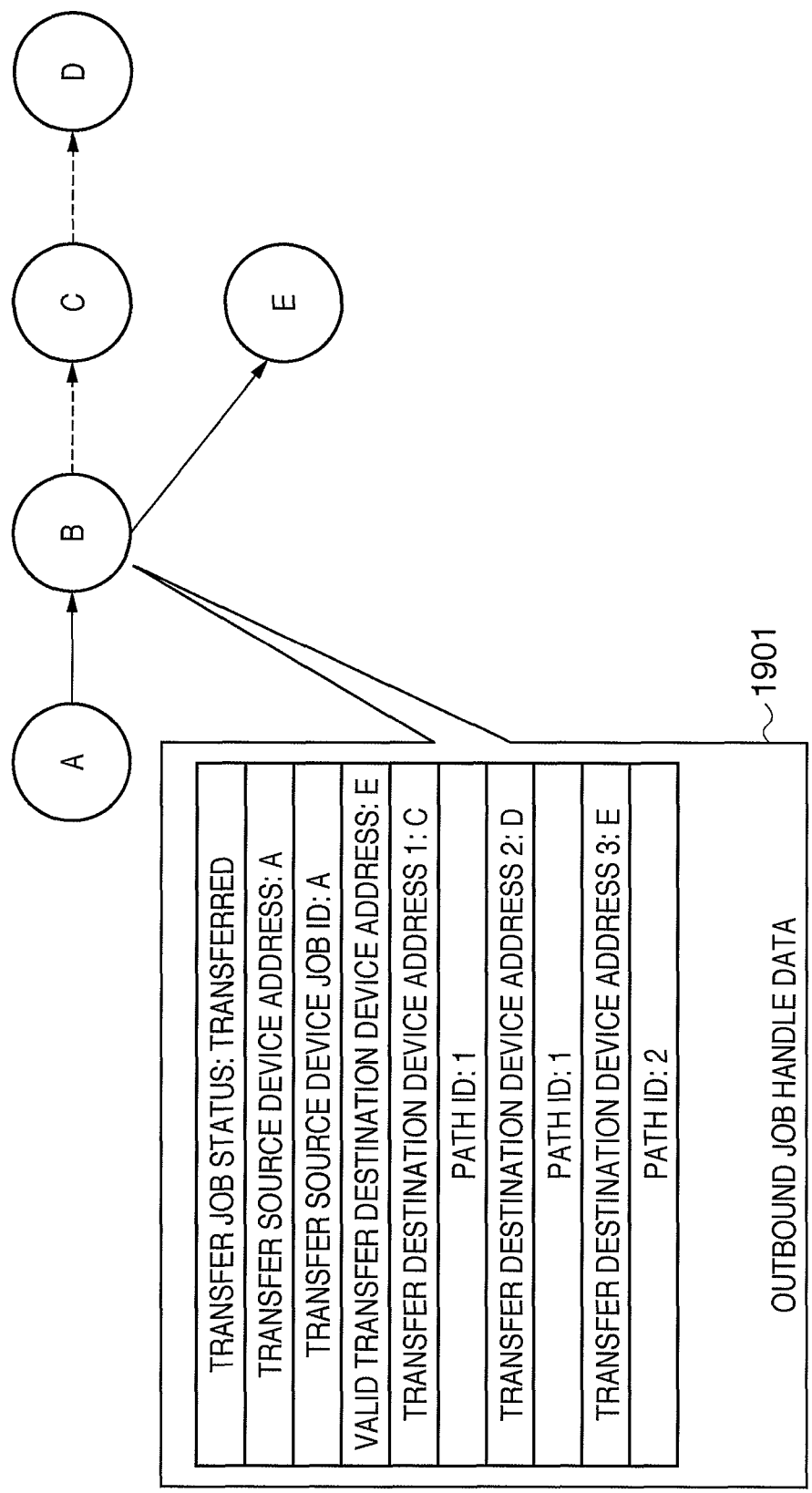
FIG. 19 is a diagram illustrating contents of a job handle when a job transfer destination device is changed in the second embodiment of the present invention.

FIG. 19 is a diagram illustrating contents of a job handle when a job transfer destination device is changed in the second embodiment of the present invention.

In FIG. 19, it is assumed that a job is set to be transferred from device A to device B to device C to device D in sequence and is currently waiting to be transferred from device B. Using the console unit 7 on one of device A to device D, the user alters the transfer destination of the job on device B to device E. When the job is consequently transferred from device B to device E, job handle data in device B is as shown in outbound job handle data 1901.

In the outbound job handle data 1901, Transfer Source Device Address and Transfer Source Device Job ID are set respectively to the address and job ID of device A, which is a transfer source for device B.

Since the transfer destination is changed in device B, Valid Transfer Destination Device Address is set to the address of device E. Transfer Destination Device Addresses 1 and 2 are set to device C and device D, respectively. The path IDs of the addresses are set to "1." Device E to which the transfer destination has been changed is added to the bottom as "Transfer Destination Device Address 3: E." The path ID of the address is set to "2." Setting the path ID makes it possible to see that on device B, devices which have job handles are divided into two branches even after the transfer of the job. The CPU 33 can see that the transfer destination is branched on the local device and can identify a device requesting job control or a device requesting a handle manipulation.

The above processes make it possible to change properties of a job from any of the transfer source and transfer destination devices even after the job is transferred.

Third Embodiment

A method for canceling a job has been described in the first embodiment and a method for altering job properties has been described in the second embodiment. In the third embodiment, a method for canceling a job transfer process will be described with reference to a flowchart in FIG. 20.

In the third embodiment, the process of canceling a job transfer process will be described with reference to the flowchart in FIG. 20. Again, processes performed in the flowchart of FIG. 16 are also performed in the third embodiment. Also, the devices have the same configuration as the multi-function peripheral according to the first embodiment, and thus description thereof will be omitted.

Processes unique to the third embodiment are started when the CPU 33 goes to Step S40 after finding in Step S37 in FIG. 16 that there is a request to cancel job transfer.

Figure 20:
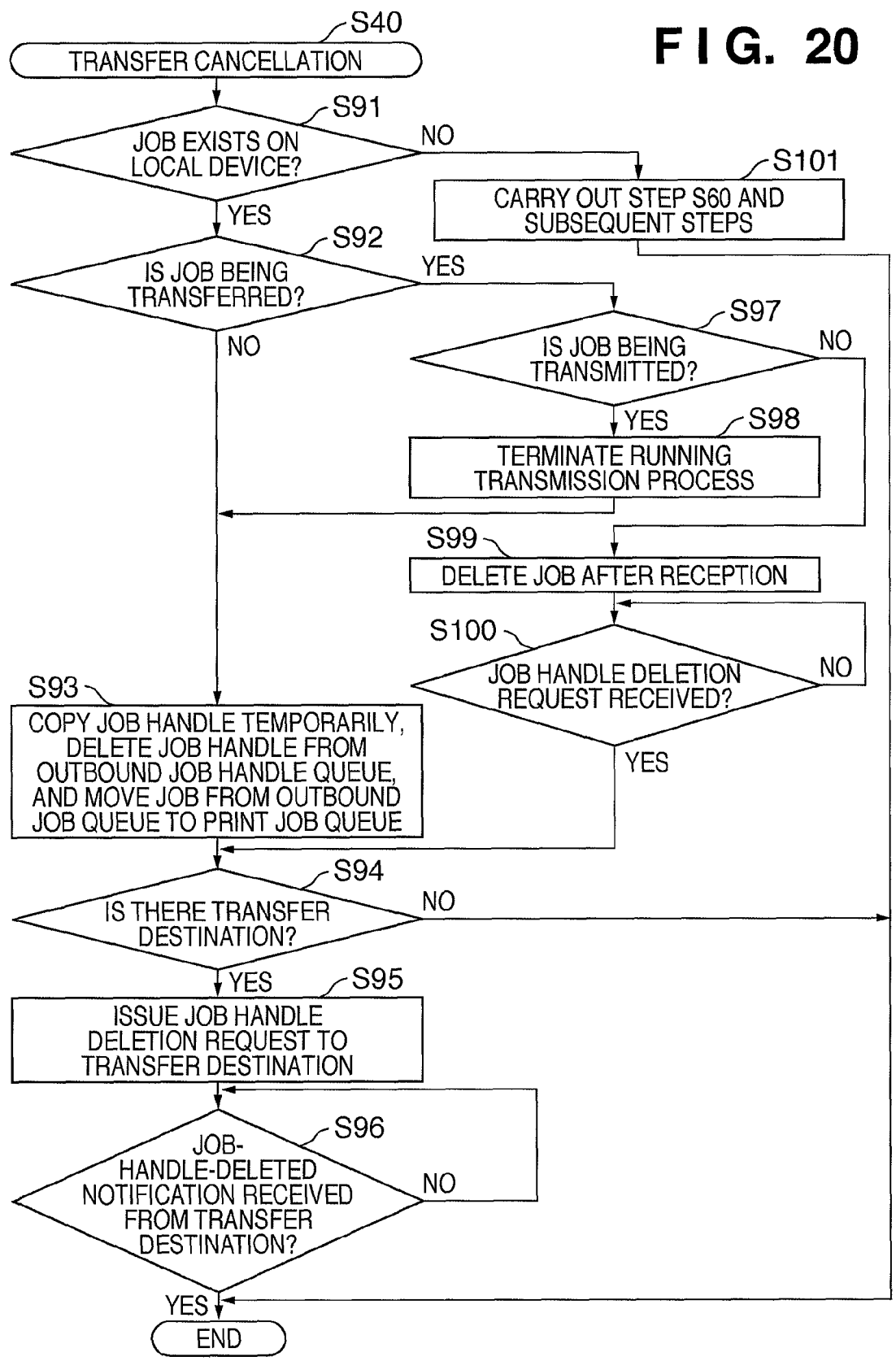
FIG. 20 is a flowchart illustrating a job transfer cancellation process (Step S40 in FIG. 16) according to a third embodiment of the present invention.

FIG. 20 is a flowchart illustrating a job transfer cancellation process (Step S40 in FIG. 16) according to the third embodiment of the present invention.

In Step S91, the CPU 33 of the device which has received a transfer cancellation request determines whether the job exists on the local device. If it is determined that the job exists on the local device (YES in Step S91), the CPU 33 goes to Step S92. Otherwise (NO in Step S91), the CPU 33 goes to Step S101. Step S101 is the process of making inquiries to other devices through the same steps as Steps S60 to S71 (FIG. 17B), and thus description thereof will be omitted.

In Step S92, the CPU 33 determines whether the job on the local device is in the process of transfer. If the job is not in the process of transfer (NO in Step S92), the CPU 33 goes to Step S93. In Step S93, the CPU 33 temporarily copies the job handle to the DRAM 38 and deletes the job handle data from the outbound job handle queue. Furthermore, the CPU 33 moves the job from the outbound job queue to the print job queue.

Next, in Step S94, the CPU 33 determines whether there is a transfer destination device based on the job handle data temporarily copied in Step S93. If it is determined that there is a transfer destination device (YES in Step S94), the CPU 33 goes to Step S95 to request the transfer destination device to delete the job handle. In Step S96, if a job-handle-deleted notification is received from the transfer destination device (YES in Step S96), the CPU 33 finishes processing. On the other hand, if it is found in Step S94 that there is no transfer destination device (NO in Step S94), the CPU 33 finishes processing immediately.

If it is determined in Step S92 that the job is in the process of transfer (YES in Step S92), the CPU 33 goes to Step S97 to determine whether the job is in the process of transmission. If it is determined that the job is in the process of transmission (YES in Step S97), the CPU 33 goes to Step S98. Otherwise (NO in Step S97), the CPU 33 goes to Step S99. In Step S98, the CPU 33 terminates the running transmission process and goes to Step S93.

In Step S99, the CPU 33 deletes the job after the reception of the job is completed. Then, the CPU 33 goes to Step S100 and waits for a job handle deletion request from the transfer source device. If a deletion request is received (YES in Step S100) the CPU 33 goes to Step S94 to perform the process described above.

The above processes make it possible to cancel a job transfer process from any of the transfer source and transfer destination devices even after the job is transferred.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-322541, filed Dec. 13, 2007, and which is hereby incorporated by reference herein in its entirety.

What is claimed is:

1. An information processing system in which a plurality of image input/output apparatus can communicate with one another via a communication medium, comprising:
a transfer unit configured to transfer a job from a first image input/output apparatus to a second image input/output apparatus;
a generating unit configured to generate a job handle used to identify the job which is to be transferred by said transfer unit and is currently on the first image input/ output apparatus, the job handle allowing the second image input/output apparatus to manipulate the job;

a job handle sending unit configured to send the job handle generated by said generating unit from the first image input/output apparatus to the second image input/output apparatus before said transfer unit transfers the job from the first image input/output apparatus to the second image input/output apparatus;

a request sending unit configured to, if the second image input/output apparatus is requested to manipulate a job which is currently on the first image input/output apparatus and which is to be transferred by said transfer unit, send a request from the second image input/output apparatus to the first image input/output apparatus, for manipulating the job, based on the job handle sent by said job handle sending unit; and a control unit configured to, if the second image input/output apparatus is requested to manipulate a job which has been transferred from the first image input/output apparatus to the second image input/output apparatus and which is currently on the second input/output apparatus, manipulate the job.

2. The information processing system according to claim 1, wherein a request for cancelling the job can be sent by the second image input/output apparatus before transfer of the job by identifying the job which is currently on the first image input/output apparatus based on the job handle.

3. The information processing system according to claim 1, wherein a request for cancelling transfer of the job from the first image input/output apparatus to the second image input/output apparatus can be sent by the second image input/output apparatus before transfer of the job by identifying the job which is currently on the first image input/output apparatus based on the job handle.

4. The information processing system according to claim 1, wherein a request for changing a property of the job can be sent by the second image input/output apparatus before transfer of the job which is currently by identifying the job on the first image input/output apparatus based the job handle.

5. The information processing system according to claim 4, wherein the property of the job is information about a transfer destination of the job.

6. The information processing system according to claim 4, wherein the property of the job is a password of the job.

7. The information processing system according to claim 1, further comprising a data processing apparatus which supplies the first image input/output apparatus with a job to which a user ID is attached, wherein the first image input/output apparatus comprises:
an input unit configured to allow a user to input a user ID, and
an authentication unit configured to authenticate the user ID input via said input unit; and
said transfer unit transfers a job from the first image input/output apparatus to the second image input/output apparatus when the user ID of the job is authenticated by said authentication unit.

8. The information processing system according to claim 1, wherein:
the first image input/output apparatus further comprises a holding unit configured to store the job handle generated by said generating unit, and
after the job is transferred, the first image input/output apparatus identifies the job on the second image input/output apparatus based on the job handle stored in said holding unit.

9. A source image input/output apparatus capable of communicating with another image input/output apparatus, comprising:
a transfer unit configured to transfer a job to a destination image input/output apparatus which is a transfer destination of the job;
a generating unit configured to generate a job handle used to identify the job which is to be transferred by said transfer unit and is not transferred yet, the job handle allowing the destination image input/output apparatus to manipulate the job;
a transmitting unit configured to transmit the job handle generated by said generating unit to the destination image input/output apparatus before said transfer unit transfers the job; and
a request receiving unit configured to receive a request for manipulating the job which is to be transferred by said transfer unit and is not transferred yet, from the destination image input/output apparatus, the request being sent by the destination image input/output apparatus based on the job handle transmitted by said transmitting unit, and the request not being sent by the destination image input/output apparatus if the destination image input/output apparatus is requested to manipulate a job which has been transferred by said transfer unit to the destination image input/output apparatus and which is currently on the destination input/output apparatus.

10. The image input/output apparatus according to claim 9, further comprising:
an input unit configured to allow a user to input a user ID; and
an authentication unit configured to authenticate the user ID input via said input unit, wherein
the job has a user ID authenticated by said authentication unit.

11. The image input/output apparatus according to claim 9, further comprising a holding unit configured to store the job handle, wherein
after the job is transferred, the job on the destination image input/output apparatus is identified based on the job handle stored in said holding unit.

12. A destination image input/output apparatus capable of communicating with another image input/output apparatus, comprising:
a receiving unit configured to receive a job handle used to identify a job which is to be transferred by and is currently on a source image input/output apparatus which is a transfer source of the job, before receiving the job;
a request sending unit configured to, if the destination image input/output apparatus is requested to manipulate a job which is currently on the source image input/output apparatus and which is to be transferred by said transfer unit, send a request for manipulating the job, to the source image input/output apparatus, based on the job handle received by said receiving unit; and
a control unit configured to, if the destination image input/output apparatus is requested to manipulate a job which has been transferred from the source image input/output apparatus to the destination image input/output apparatus and which is currently on the destination input/output apparatus, manipulate the job.

13. The image input/output apparatus according to claim 12, wherein the manipulation of the job is cancellation of the job.

14. The image input/output apparatus according to claim 12, wherein the manipulation of the job is cancellation of transfer of the job.

15. The image input/output apparatus according to claim 12, wherein the manipulation of the job is change of a property of the job.

16. The image input/output apparatus according to claim 15, wherein the property of the job is information about a transfer destination of the job.

17. The image input/output apparatus according to claim 15, wherein the property of the job is a password of the job.

18. A data processing method for an information processing system in which a plurality of image input/output apparatus can communicate with one another, the data processing method comprising:

transferring a job from a first image input/output apparatus to a second image input/output apparatus;

generating a job handle used to identify the job which is to be transferred from the first image input/output apparatus to the second image input/output apparatus and is currently on the first image input/output apparatus, the job handle allowing the second image input/output apparatus to manipulate the job;

sending the generated job handle from the first image input/output apparatus to the second image input/output apparatus before the job is transferred from the first image input/output apparatus to the second image input/output apparatus;

if the second image input/output apparatus is requested to manipulate a job which is currently on the first image input/output apparatus and which is to be transferred from the first image input/output apparatus to the second image input/output apparatus, sending a request from the second image input/output apparatus to the first image input/output apparatus, for manipulating the job, based on the sent job handle; and if the second image input/output apparatus is requested to manipulate a job which has been transferred from the first image input/output apparatus to the second image input/output apparatus and which is currently on the second input/output apparatus, manipulating the job.

* * * * *